United States Patent
Laroia et al.

(10) Patent No.: US 9,912,865 B2
(45) Date of Patent: Mar. 6, 2018

(54) METHODS AND APPARATUS FOR SUPPORTING BURST MODES OF CAMERA OPERATION

(71) Applicant: THE LIGHTCO INC., Palo Alto, CA (US)

(72) Inventors: Rajiv Laroia, Far Hills, NJ (US); Nitesh Shroff, Palo Alto, CA (US); Sapna A Shroff, Sunnyvale, CA (US)

(73) Assignee: Light Labs Inc., Palo Alto, CA (US)

(*) Notice: Subject to any disclaimer, the term of this patent is extended or adjusted under 35 U.S.C. 154(b) by 0 days.

(21) Appl. No.: 14/886,050

(22) Filed: Oct. 17, 2015

(65) Prior Publication Data
US 2016/0112650 A1    Apr. 21, 2016

Related U.S. Application Data

(60) Provisional application No. 62/065,534, filed on Oct. 17, 2014, provisional application No. 62/242,911, filed on Oct. 16, 2015.

(51) Int. Cl.
*H04N 5/265* (2006.01)
*G06T 11/60* (2006.01)
(Continued)

(52) U.S. Cl.
CPC ........... *H04N 5/23245* (2013.01); *G06T 7/20* (2013.01); *G06T 11/60* (2013.01); *H04N 5/2254* (2013.01);
(Continued)

(58) Field of Classification Search
CPC ............... H04N 5/2257; H04N 5/2356; H04N 5/23245; H04N 5/2353
(Continued)

(56) References Cited

U.S. PATENT DOCUMENTS 4,890,133 A    12/1989   Ogawa et al.
5,078,479 A    1/1992    Vuilleumier
(Continued)

FOREIGN PATENT DOCUMENTS

EP    2642757 A2    9/2013
JP    10091765       4/1998
(Continued)

OTHER PUBLICATIONS

International Search Report and Written Opinion of the International Searching Authority from International Application No. PCT/US2015/056117, pp. 1-8, dated Mar. 10, 2016.
(Continued)

*Primary Examiner* — Antoinette Spinks
(74) *Attorney, Agent, or Firm* — Straub & Straub; Michael P. Straub; Stephen T. Straub

(57) ABSTRACT

In various embodiments a camera with multiple optical chains, e.g., camera modules, is controlled to operate in one of a variety of supported modes of operation. The modes include a non-motion mode, a motion mode, a normal burst mode and/or a reduced data burst mode. Motion mode is well suited for capturing an image including motion, e.g., moving object(s) with some modules being used to capture scene areas using a shorter exposure time than other modules and the captured images then being combined taking into consideration locations of motion. A reduced data burst mode is supported in some embodiments in which camera modules with different focal lengths capture images at different rates. While the camera modules of different focal length operate at different image capture rates in the reduced data burst mode, images are combined to support a desired composite image output rate, e.g., a desired frame rate.

20 Claims, 22 Drawing Sheets

(51) Int. Cl.
  *H04N 5/225*   (2006.01)
  *H04N 5/232*   (2006.01)
  *G06T 7/20*    (2017.01)
  *H04N 5/235*   (2006.01)

(52) U.S. Cl.
  CPC ......... *H04N 5/2257* (2013.01); *H04N 5/2258* (2013.01); *H04N 5/2353* (2013.01); *H04N 5/2356* (2013.01); *H04N 5/23216* (2013.01); *H04N 5/23229* (2013.01); *H04N 5/265* (2013.01); *G06T 2207/10144* (2013.01); *G06T 2207/10148* (2013.01); *G06T 2207/20221* (2013.01)

(58) Field of Classification Search
  USPC .................................................. 348/218.1
  See application file for complete search history.

(56) References Cited

U.S. PATENT DOCUMENTS

| | | | |
|---|---|---|---|
| 5,153,569 A | 10/1992 | Kawamuraa et al. | |
| 5,353,068 A | 10/1994 | Moriwake | |
| 5,583,602 A | 12/1996 | Yamamoto | |
| 5,781,331 A | 7/1998 | Carr | |
| 5,889,553 A | 3/1999 | Kino et al. | |
| 5,975,710 A | 11/1999 | Luster | |
| 5,982,951 A | 11/1999 | Katayama et al. | |
| 6,011,661 A | 1/2000 | Weng | |
| 6,028,600 A | 2/2000 | Rosin et al. | |
| 6,081,670 A | 6/2000 | Madsen et al. | |
| 6,141,034 A | 10/2000 | McCutchen | |
| 7,009,652 B1 | 3/2006 | Tanida et al. | |
| 7,280,735 B2 | 10/2007 | Thibault | |
| 7,315,423 B2 | 1/2008 | Sato | |
| 7,551,358 B2 | 6/2009 | Lee et al. | |
| 7,561,201 B2 | 7/2009 | Hong | |
| 7,801,428 B2 | 9/2010 | Nagaishi et al. | |
| 7,810,511 B2 | 10/2010 | Fagrenius et al. | |
| 8,144,230 B2 | 3/2012 | Watanabe et al. | |
| 8,194,169 B2 | 6/2012 | Tamaki et al. | |
| 8,199,222 B2 | 6/2012 | Drimbarean et al. | |
| 8,237,841 B2 | 8/2012 | Tanida et al. | |
| 8,320,051 B2 | 11/2012 | Matsumura et al. | |
| 8,417,058 B2 | 4/2013 | Tardif | |
| 8,482,637 B2 | 7/2013 | Ohara et al. | |
| 8,520,022 B1 | 8/2013 | Cohen et al. | |
| 8,553,106 B2 | 10/2013 | Scarff | |
| 8,619,082 B1 | 12/2013 | Ciurea et al. | |
| 8,639,296 B2 | 1/2014 | Ann et al. | |
| 8,665,341 B2 | 3/2014 | Georgiev et al. | |
| 8,704,944 B1 | 4/2014 | Wierzoch et al. | |
| 8,762,895 B2 | 6/2014 | Metha et al. | |
| 8,774,517 B1* | 7/2014 | Khosla ................ | G06K 9/4623 348/231.3 |
| 8,780,258 B2 | 7/2014 | Lee | |
| 8,896,655 B2 | 11/2014 | Mauchly et al. | |
| 9,041,826 B2 | 5/2015 | Jung et al. | |
| 9,104,705 B2 | 8/2015 | Fujinaga | |
| 9,135,732 B2 | 9/2015 | Winn et al. | |
| 9,241,111 B1* | 1/2016 | Baldwin ................ | G03B 35/08 |
| 9,282,228 B2 | 3/2016 | Laroia | |
| 9,374,514 B2 | 6/2016 | Laroia | |
| 2002/0149691 A1 | 10/2002 | Pereira et al. | |
| 2003/0018427 A1 | 1/2003 | Yokota et al. | |
| 2003/0020814 A1 | 1/2003 | Ono | |
| 2003/0185551 A1 | 10/2003 | Chen | |
| 2004/0100479 A1 | 5/2004 | Nakano et al. | |
| 2004/0227839 A1 | 11/2004 | Stavely et al. | |
| 2005/0088546 A1 | 4/2005 | Wang | |
| 2005/0200012 A1 | 9/2005 | Kinsman | |
| 2006/0067672 A1 | 3/2006 | Washisu et al. | |
| 2006/0187338 A1 | 8/2006 | May et al. | |
| 2006/0221218 A1 | 10/2006 | Alder et al. | |
| 2006/0238886 A1 | 10/2006 | Kushida et al. | |
| 2006/0281453 A1 | 12/2006 | Jaiswal et al. | |
| 2007/0050139 A1 | 3/2007 | Sidman | |
| 2007/0065012 A1 | 3/2007 | Yamakado et al. | |
| 2007/0127915 A1 | 6/2007 | Lu et al. | |
| 2007/0177047 A1 | 8/2007 | Goto | |
| 2007/0182528 A1 | 8/2007 | Breed et al. | |
| 2008/0030592 A1 | 2/2008 | Border et al. | |
| 2008/0074755 A1 | 3/2008 | Smith | |
| 2008/0084484 A1 | 4/2008 | Ochi et al. | |
| 2008/0111881 A1 | 5/2008 | Gibbs et al. | |
| 2008/0180562 A1 | 7/2008 | Kobayashi | |
| 2008/0211941 A1 | 9/2008 | Deever et al. | |
| 2008/0219654 A1 | 9/2008 | Border et al. | |
| 2008/0240698 A1 | 10/2008 | Bartilson et al. | |
| 2008/0247745 A1 | 10/2008 | Nilsson | |
| 2008/0251697 A1 | 10/2008 | Park et al. | |
| 2008/0278610 A1 | 11/2008 | Boettiger | |
| 2009/0086032 A1 | 4/2009 | Li | |
| 2009/0136223 A1 | 5/2009 | Motomura et al. | |
| 2009/0154821 A1 | 6/2009 | Sorek et al. | |
| 2009/0225203 A1 | 9/2009 | Tanida et al. | |
| 2009/0278950 A1 | 11/2009 | Deng et al. | |
| 2009/0290042 A1 | 11/2009 | Shiohara | |
| 2010/0013906 A1 | 1/2010 | Border et al. | |
| 2010/0021085 A1 | 1/2010 | Kabasawa | |
| 2010/0034531 A1 | 2/2010 | Go | |
| 2010/0045774 A1 | 2/2010 | Len et al. | |
| 2010/0053414 A1 | 3/2010 | Tamaki et al. | |
| 2010/0079635 A1 | 4/2010 | Yano et al. | |
| 2010/0091089 A1 | 4/2010 | Cromwell et al. | |
| 2010/0097443 A1 | 4/2010 | Lablans | |
| 2010/0225755 A1 | 9/2010 | Tamaki et al. | |
| 2010/0238327 A1 | 9/2010 | Griffith et al. | |
| 2010/0265346 A1 | 10/2010 | Iizuka | |
| 2010/0296802 A1 | 11/2010 | Davies | |
| 2011/0051243 A1 | 3/2011 | Su | |
| 2011/0063325 A1 | 3/2011 | Saunders | |
| 2011/0069189 A1 | 3/2011 | Venkataraman et al. | |
| 2011/0080655 A1 | 4/2011 | Mori | |
| 2011/0123115 A1 | 5/2011 | Lee et al. | |
| 2011/0128393 A1 | 6/2011 | Tavi et al. | |
| 2011/0157430 A1 | 6/2011 | Hosoya et al. | |
| 2011/0157451 A1 | 6/2011 | Chang | |
| 2011/0187878 A1 | 8/2011 | Mor et al. | |
| 2011/0193984 A1 | 8/2011 | Kitaya et al. | |
| 2011/0221920 A1 | 9/2011 | Gwak | |
| 2011/0222167 A1 | 9/2011 | Iwasawa | |
| 2011/0242342 A1 | 10/2011 | Goma et al. | |
| 2011/0280565 A1 | 11/2011 | Chapman | |
| 2011/0285895 A1 | 11/2011 | Weng et al. | |
| 2012/0002096 A1 | 1/2012 | Choi et al. | |
| 2012/0033069 A1 | 2/2012 | Becker et al. | |
| 2012/0062691 A1 | 3/2012 | Fowler et al. | |
| 2012/0155848 A1 | 6/2012 | Labowicz et al. | |
| 2012/0162464 A1 | 6/2012 | Kim | |
| 2012/0188391 A1 | 7/2012 | Smith | |
| 2012/0027462 A1 | 8/2012 | Justice | |
| 2012/0242881 A1 | 9/2012 | Suzuki | |
| 2012/0249815 A1 | 10/2012 | Bohn et al. | |
| 2012/0257013 A1 | 10/2012 | Witt et al. | |
| 2012/0257077 A1 | 10/2012 | Suzuki | |
| 2012/0268642 A1 | 10/2012 | Kawai | |
| 2013/0027353 A1 | 1/2013 | Hyun | |
| 2013/0050564 A1 | 2/2013 | Adams, Jr. et al. | |
| 2013/0057743 A1 | 3/2013 | Minagawa et al. | |
| 2013/0064531 A1 | 3/2013 | Pillman et al. | |
| 2013/0076928 A1 | 3/2013 | Olsen | |
| 2013/0086765 A1 | 4/2013 | Chen | |
| 2013/0088614 A1 | 4/2013 | Lee | |
| 2013/0093842 A1 | 4/2013 | Yahata | |
| 2013/0093947 A1 | 4/2013 | Lee et al. | |
| 2013/0100272 A1 | 4/2013 | Price et al. | |
| 2013/0153772 A1 | 6/2013 | Rossi et al. | |
| 2013/0155194 A1 | 6/2013 | Sacre et al. | |
| 2013/0194475 A1 | 8/2013 | Okamoto | |
| 2013/0208127 A1* | 8/2013 | Chou ................ | H04N 5/23216 348/169 |
| 2013/0222676 A1 | 8/2013 | Ono | |
| 2013/0223759 A1 | 8/2013 | Nishiyama | |

(56) References Cited

U.S. PATENT DOCUMENTS

| | | |
|---|---|---|
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0293079 A1 | 10/2014 | Milanfar et al. |
| 2014/0307044 A1 | 10/2014 | Sharma et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0253647 A1 | 9/2015 | Mercado |
| 2015/0279012 A1 | 10/2015 | Brown et al. |
| 2016/0142610 A1 | 5/2016 | Rivard et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Segan, S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

Robertson, M et al "Dynamic Range Improvement Through Multiple Exposures". 1999. [online] [retrieved on Apr. 16, 2014]:<URL:http://ieexplore.ieee.org/xpl/login.jsp?tp=&arnumber=817091&url=http%3A%2F%2Fieeexplore.ieee.org%2Fxpls%2Fabs_alljsp%3Farnumber%3D817091>, pp. 1-6.

* cited by examiner

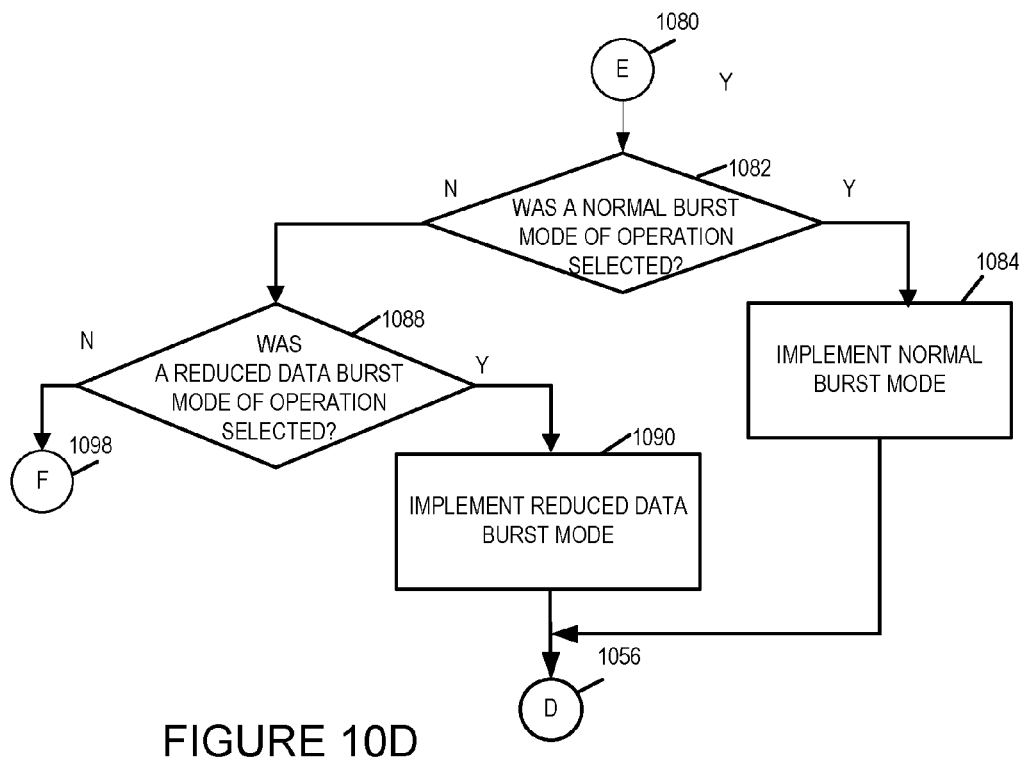

METHODS AND APPARATUS FOR SUPPORTING BURST MODES OF CAMERA OPERATION

RELATED APPLICATIONS

The present application claims the benefit of U.S. Provisional Application Ser. No. 62/065,534 filed Oct. 17, 2014 and U.S. Provisional Patent Application Ser. No. 62/242,911 filed Oct. 16, 2015 both of which are hereby expressly incorporated by reference in their entirety.

BACKGROUND

In an attempt to address some of the shortcomings of handheld camera devices, the use of a camera with multiple camera modules each of which may be used to capture an image has been suggested.

Capturing subjects performing relatively higher speed actions is popularly known as the action shots. Examples of action shots are shots of sports scenes with motion, e.g., with individuals moving such as for example as part of a soccer game or other type of game, car race shots, etc. Such action shots are common in both consumer photography and professional photography e.g., sports photography.

In the existing camera systems, action shots are typically captured by reducing the global exposure time. In such an approach the exposure time used by a camera is reduced. Doing so, reduces the blur produced in the subject, but also reduces the exposure for the background. This, in turn, increases the noise in the image given the reduction in light collection time and reduces the effective quality of the photograph generated using the reduced exposure time.

While memory costs have decreased, capturing large number of images, can still consume a large amount of memory particularly when an individual image is re-presented in using mega-pixels. The storage requirements are magnified considerably when a camera includes multiple optical chains each of which may be operated in parallel to capture a separate image.

Consider for example the case where a camera device includes which N number of camera modules each of which might be operated in parallel to capture separate images. In such a case, memory requirements during each capture period in which the N modules were used would be N times what would be required if a single camera module were used. In the case of still image capture, where relatively few images or frames are captured each second the memory requirements associated with operating multiple camera modules in parallel may be manageable for a handheld device. This may be particularly the case where a photographer's may move the camera between shots and take the time to frame or manipulate the scene between each shot. In such applications the number of images captured per second maybe relatively low, e.g., with the time period between shots being on average above a second in some cases.

While taking individual photographs where the camera is carefully positioned is important to many hand held camera owners, in cases where there is motion a user may want to take what is sometimes referred to as a burst sequence with images being captured in quick succession. Also a user of a handheld camera may want to capture video for a brief or extended period of time requiring images to be captured sequentially at a desired frame rate, e.g. $\frac{1}{30}$ of a second or $\frac{1}{60}$th of a second. In the case of burst mode it may be desirable to capture images even more quickly in an attempt to avoid the effect of motion blur and/or to avoid the risk of missing a key shot if a lower image capture rate were used.

When capturing multiple frames per second in burst or video mode, the amount of data which is captured and stored can be considerable. This problem is multiplied considerably when multiple camera modules are operated in parallel even for short periods of time during which a high image capture rate is used. Furthermore, in addition to using large amounts of memory operating multiple camera modules in parallel can increase power requirements and drain a battery more quickly than if fewer camera modules were being used.

It would be desirable if new methods, apparatus and/or modes of operation could be developed which could take advantage of one or more features of a camera device with multiple camera modules to support one or more operations such as taking a burst series of images, capturing video, and/or capturing images of a scene including motion.

While not necessary for all embodiments, it would be desirable if one or more features in at least some embodiments allowed action shots to be captured without the undesirable blur associated with using long exposure times to capture areas where there is motion but also without all or much of the undesirable noise associated with using short exposure times. In addition, while not necessary for all embodiments it would be desirable if methods, apparatus and/or modes of operation could be developed which support data efficient and/or energy efficient burst and/or video image capture modes of operation in camera devices with multiple camera modules.

SUMMARY

Methods, apparatus and features which support one or more modes of operation in a camera device, e.g., a handheld camera device, including multiple camera modules, also sometimes referred to as optical chains, are described. The device in various embodiments includes 9 or more modules with over 10 modules being included in many embodiments. While the methods work well with large numbers of modules large numbers of modules are not required for all embodiments or to take advantage of many or all of the described features and the techniques can be used with camera devices including 2, 3 or more modules.

Various modes of operation are supported. The supported modes of operation include one or more of a normal image capture mode, a normal burst mode, a reduced data burst mode one, and/or a motion mode of operation. All the modes need not be supported in all embodiments with some embodiments supporting one or a few of the above mentioned modes of operation The mode of operation to be used at a given time may, and in some embodiments is, specified by user input. For example, a user may manually set whether the camera is to operate in a non-motion mode of operation or a motion capture mode of operation. Or the user may select a reduced data burst mode of operation if desired or some other mode of operation. Alternatively, the camera may automatically determine the mode of operation to use based on one or more captured images. The images may be captured for purposes of camera focusing or preview or because a user triggered the taking and storing of a picture. In the case of automatic camera mode control, areas of motion in one or more captured images are identified and camera module exposure control is then based on the detected motion.

The normal image capture mode of operation is well suited for capturing still images also referred to as static images. In one exemplary embodiment, during the normal, e.g., static image, capture mode of operation different camera modules, e.g., with different focal lengths, may be operated using the same exposure time in parallel to capture multiple images of the scene area. Captured images may and sometimes are then combined, to generate a composite image. Such an approach works well with static images, e.g, which capture a scene area without motion or with little motion.

In at least some embodiments a motion mode of operation is supported. The motion, e.g., action shot, mode of operation is well suited for capturing scene areas where a portion of the scene area includes motion. In some embodiments during the motion mode of operation a camera module with a shorter focal length than at least one other camera module used to capture images is controlled to capture an image of a scene area using a first exposure time. The first exposure time maybe, and sometimes is determined from the content of a preview image without regard to motion. Thus, the first exposure time is well suited for capturing a large scene area even though portion of the scene area may include motion. During the motion mode of operation, camera modules with longer focal lengths capture portions of the scene area, e.g., because they correspond to a higher zoom level than the shorter focal length module. Whether a scene portion corresponds to motion or not is taken into consideration when determining the exposure time of the camera modules having the second, e.g., longer, focal length. If camera module corresponds to a scene portion with motion, the exposure time is selected to be lower than the exposure time of the camera module having the shorter focal length. However, if the camera module having the second longer focal length corresponds to a scene portion with no motion, the same exposure time used for the first camera module with the shorter focal length is used. However, in other embodiments, the exposure time for the camera module corresponding to the portion of the scene area without motion is determined independently based on the content of the scene portion to which the camera module corresponds without regard to motion when the camera module is determined to correspond to a scene portion without motion or with little motion. For camera modules with the second, e.g., longer, focal length which correspond to portions of a scene area with motion, an exposure time is used which is shorter than the exposure time used for the first camera module having the first, e.g., shorter, focal length. In this way, at least one image of scene area of interest will be captured with an exposure time optimized for the overall scene area while portion of the scene area with motion will be captured by a camera module or modules having a shorter exposure time which will reduce blurriness due to motion but potentially at the cost of using a less than optimal exposure time.

In some but not necessarily all embodiments, the exposure time used by camera modules having the second, longer, focal length and corresponding to scene portions of motion have exposure times which are determined based on the amount of motion in the scene portion. The amount of motion maybe estimated based on blurriness of a preview image with a blurrier image indicating a higher amount of motion then a less blurry image. The greater the amount of motion in a scene portion, the lower the exposure time used for a camera module having the same, e.g., longer, focal length than that used to capture the overall scene. Thus, in some but not necessarily all embodiments, in the case of motion, multiple camera modules having the same, e.g., second, focal length, but corresponding to different scene portions, e.g., one with no motion, one with a first level of motion and one with a second higher level of motion, may each use different exposure times with the exposure time decreasing as the amount of motion increases.

Composite images maybe, and sometimes are generated from images captured in parallel using different camera modules, e.g., with different focal lengths and/or exposure times. Normalization of the pixel values of different captured by different camera modules to compensate for different exposure times prior to or as part of the combining process maybe and sometime is performed.

In some embodiments, during generation of composite images from images captured during a motion mode of operation, pixel values from different images are weighted as part of the combining process. The weighting of a pixel value takes into consideration whether the pixel value corresponds to an area of motion or not. In cases where a pixel value corresponds to an area of motion, pixel values from images with shorter exposure times are weighted more heavily than pixel values corresponding to images generated with longer exposure times. For pixels which correspond to scene area with little or no motion, pixel values corresponding to images with the longer exposure, e.g, the exposure time used for the camera module with the shortest focal length, are weighted more heavily than pixel values corresponding to images with shorter exposure times.

In some embodiments analysis of images is performed to identify which sub portions of a captured image correspond to areas of motion. The analysis may involve examining one or more images for blurriness which maybe indicative of motion and/or comparing of portions of images corresponding to the same scene area but which were captured with different exposure times with differences between the pixel values being indicative of motion. Thus, while portions of a scene captured by a camera module may be designated as corresponding to motion based on user input or analysis of a preview image for purposes of determining what exposure to use for a camera module during the image capture process, more detailed analysis of the captured images maybe performed to determine the appropriate weighting to be applied when combining pixel values from different images to generate a pixel value of a composite, e.g., output, image.

The generation of the composite image maybe performed by the camera device or a system, e.g., computer system including a processor and memory, as part of a post capture image processing process used to generate one or more composite images.

By controlling exposure times of different camera modules based on whether a camera module captures a scene portion corresponding to motion or not, and combining pixel values with pixel values from an image captured using an exposure time which was determined with regard to whether or not the scene included motion, the benefits of longer exposure times for static image portions and shorter exposure times for scene portions with motion can be achieved from images captured by a single camera device.

In at least some embodiments, a camera device including multiple camera modules supports a normal burst mode of operation. During the normal burst mode of operation each of a set of camera modules is operated in parallel during a number of successive image capture time periods corresponding to a period of time in which the camera operates in burst mode. The images from the camera modules are stored and then combined, e.g., to generate a composite image for each image capture time period. In such an embodiment since each camera module used for burst mode is operated during the individual image capture time periods, a large number of images are captured and stored. Such a mode can produce high quality images but can also require a large amount of memory to store the images captured during each capture time period as well as a fair amount of power to operate the full set of modules during each image capture time period.

In at least one embodiment, a camera device including multiple camera modules supports a reduced data burst mode. The reduced data burst can be provided as an alternative to the normal data burst mode or, in some embodiments the camera device allows the user to select between use of the normal burst mode and reduced data burst mode.

The reduced data burst mode in some embodiments maybe used as a video capture mode of operation. The reduced data video mode of operation can be considered a special case of burst mode where the image capture rate is intended to support a desired video frame rate.

In various embodiments in which a reduced data burst mode is supported, a camera device supporting the mode of operation includes a plurality of different optical chains, e.g., camera modules. At least some of the camera modules have different focal lengths. During the reduced data burst mode of operation, different camera modules are operated at different image capture rates during a capture time interval. In at least some embodiments a camera module having a first, e.g., short, focal length captures images at a lower rate than a camera module having a second, e.g., longer focal length. Camera modules having a third, e.g., focal length, longer than the first and send focal lengths maybe operated at the same image capture rate as the camera modules with the second focal length or at a faster image capture rate depending on the embodiment.

By capturing images at different rates, the full set of camera modules used during the reduced data burst mode of operation will not operate during all image capture time periods. Thus fewer images are captured and stored as compared to embodiments where the full set of camera modules used during burst mode are used during each capture time interval.

In one particular exemplary embodiment camera modules having the longest focal length used during a reduced data burst mode of operation are used to capture images during each capture time period while one or more of the shorter focal length camera modules may be used once or a few times during a capture time interval.

A composite image output stream is generated in some embodiments by combining the same image captured by a short focal length camera module with multiple images captured by the longer focal length camera module at different times. Thus, while the longer focal length camera modules may capture motion or other information at relatively frequent intervals, e.g., at a desired output composite image rate, the shorter focal length modules used to capture a large scene area which maybe mostly background which does not change frequently over time, maybe captured at a relatively low rate. By using the reduced data burst mode of operation storage requirements are reduced as compared to the normal burst mode since fewer images are captured and stored in a given time period, e.g., a fraction of the number captured and stored in the normal burst mode. Power consumption is also reduced since fewer camera modules are operated in parallel during at least some image capture time periods. While power data storage requirements and power consumption is reduced as compared to normal burst mode, in the reduced data burst mode quality of the composite images remains good since changes due to motion are likely to be captured by the longer focal length modules which are normally directed to the area of greatest interest as part of a user's normal process of orienting a camera to capture the scene portions of interest. While in burst mode camera modules normally use the same exposure time irrespective of their focal length, in cases where exposure time used for the shorter focal length camera exceeds the desired composite image output frame rate, the exposure time of the camera modules with the longer focal length is decreased to allow for more images to be captured in a given time period. Images may be subject to an exposure normalization process prior to the pixel values being combined to compensate for different exposure times in cases where different camera modules use different exposure times.

During reduced data burst mode operation images captured from the camera modules operating at different image capture rates are stored in memory. the images are then combined, e.g., by the camera or by another system performing post capture image processing, to generate a composite image stream having a desired image output rate, e.g., frame rate.

In some embodiments during reduced data burst mode camera modules having the longest focal length, and thus capture the portion of the scene area in the greatest detail, are sometimes operated to capture images at the desired output rate, e.g., the rate of a video stream or burst sequence to be generated.

It should be appreciated that while a camera device may support multiple modes of operation, e.g., two or more of the different modes of operation discussed above, this is not necessary for all camera device embodiments.

Numerous additional features and embodiments are discussed in the detailed description which follows.

BRIEF DESCRIPTION OF THE FIGURES

FIG. 10, which comprises the combination of FIGS. 10A, 10B, 10C and 10D, is a flow chart showing the steps of an exemplary method of capturing images using multiple camera modules in accordance with one exemplary embodiment.

FIG. 10D is a fourth part of the flowchart of FIG. 10 illustrating the steps of an exemplary method of capturing images using multiple camera modules.

DETAILED DESCRIPTION

Figure 1:
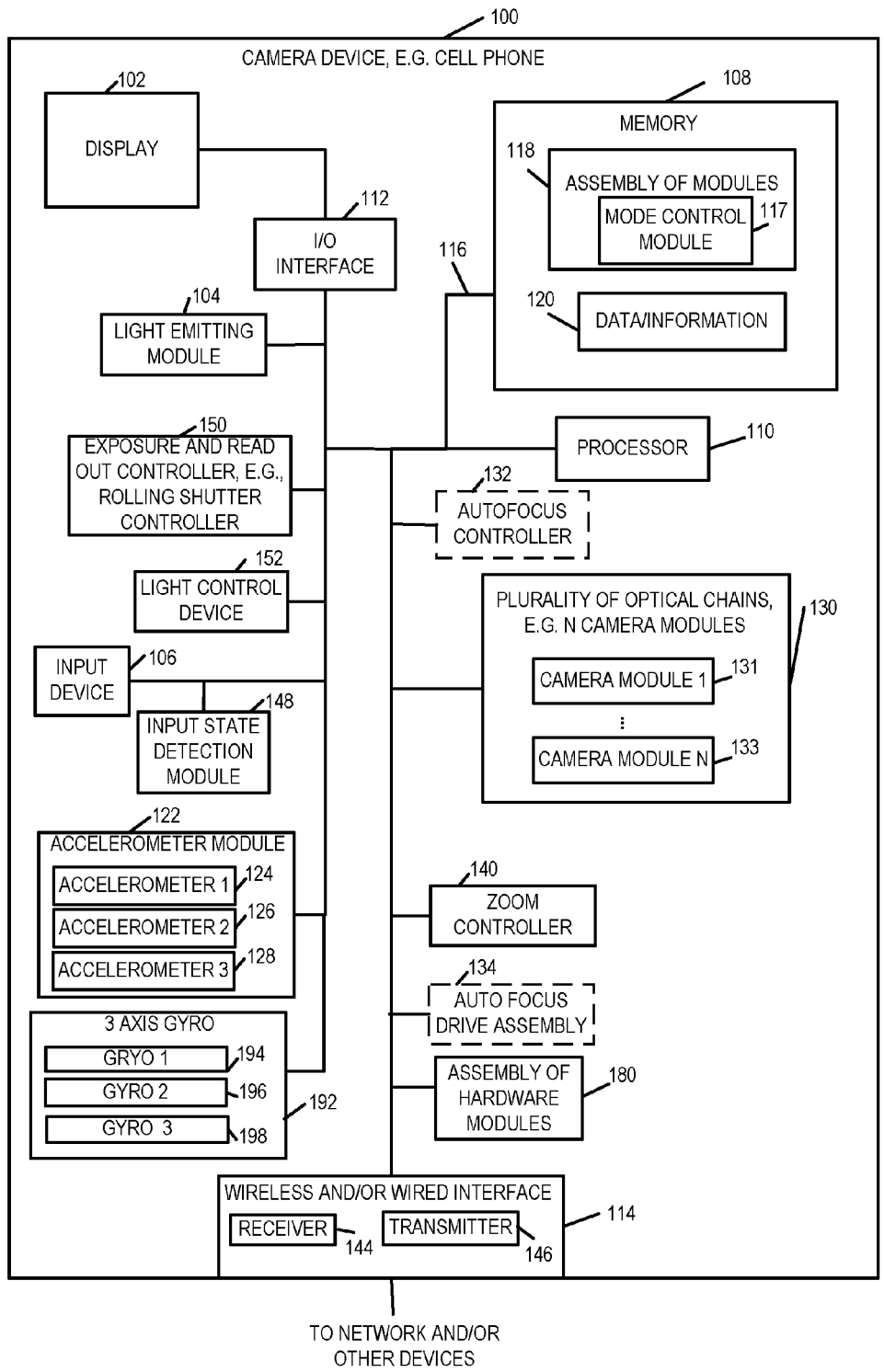
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 7:
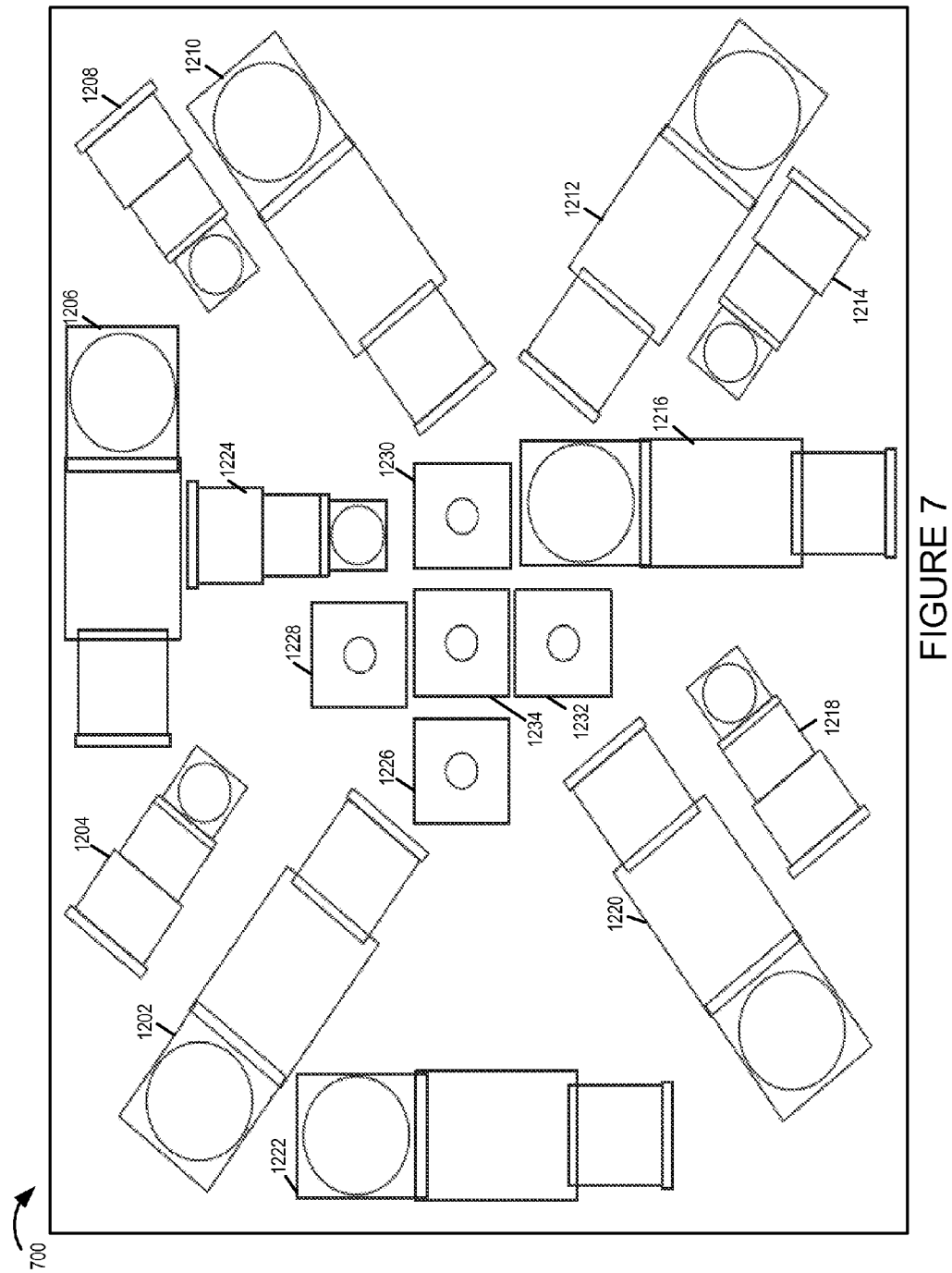
FIG. 7 illustrates an arrangement of optical chains, e.g., camera modules, used in one embodiment to implement a camera device of the type shown in FIG. 6A with the lens arrangement shown in FIG. 6B.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7 while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments. The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input. The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed as will be discussed below with regard to FIGS. 5 and 34 depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Figure 18:
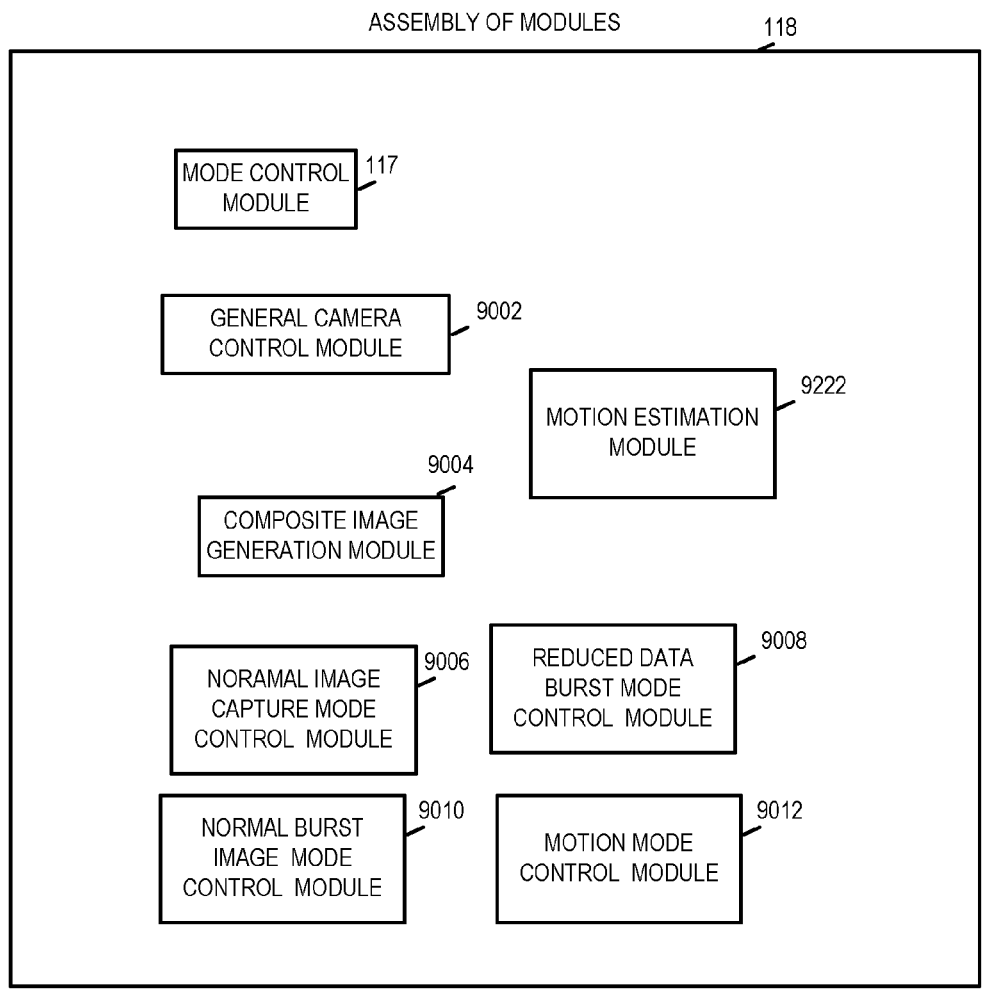
FIG. 18 illustrates an assembly of modules that can be used in any of the cameras shown and discussed in the present application.

Referring briefly to FIG. 18, FIG. 18 illustrates an exemplary of modules which can be used in the camera device shown in FIG. 1 or any of the other camera devices described in the present application.

FIG. 18 illustrates and assembly of modules 118 which can be used in the camera device of FIG. 1 or any of the other camera devices described herein and which, when executed by the processor of the camera device control the camera device to implement one, more or all the steps of the method or methods described herein. The assembly of modules 118 includes a mode control module 117 which is response to user input to determine a mode of operation in which to operate and/or automatically determines the mode in which to operate based on a preview image captured by the camera device and/or other input in the absence of the user designating a mode of operation to be used. The assembly of modules also includes a general camera control module 9002 for controlling operations for which other modules are not provide. Operations which can be controlled by module 9002 include for example, exposure settings, flash control, etc. Individual modules are provided to support particular modes of operation and control the camera to operate, e.g., implement the method steps, corresponding to the mode of operation to which the module corresponds. For example the assembly of modules 118 includes a normal image capture mode control module 9006, a normal burst mode control module 9010, a reduced data burst mode control module 9008 and a motion mode control module 9012. In addition a module for controlling composite image generation, e.g., composite image generation module 9004 is also included. A motion estimation module 9222 is also included for identifying areas of motion in a scene area and for identifying within a portion of a scene specific areas of motion, e.g, corresponding to individual pixels of a captured image. Motion estimation performed by module 9222 maybe used in a variety of steps and/or operations.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
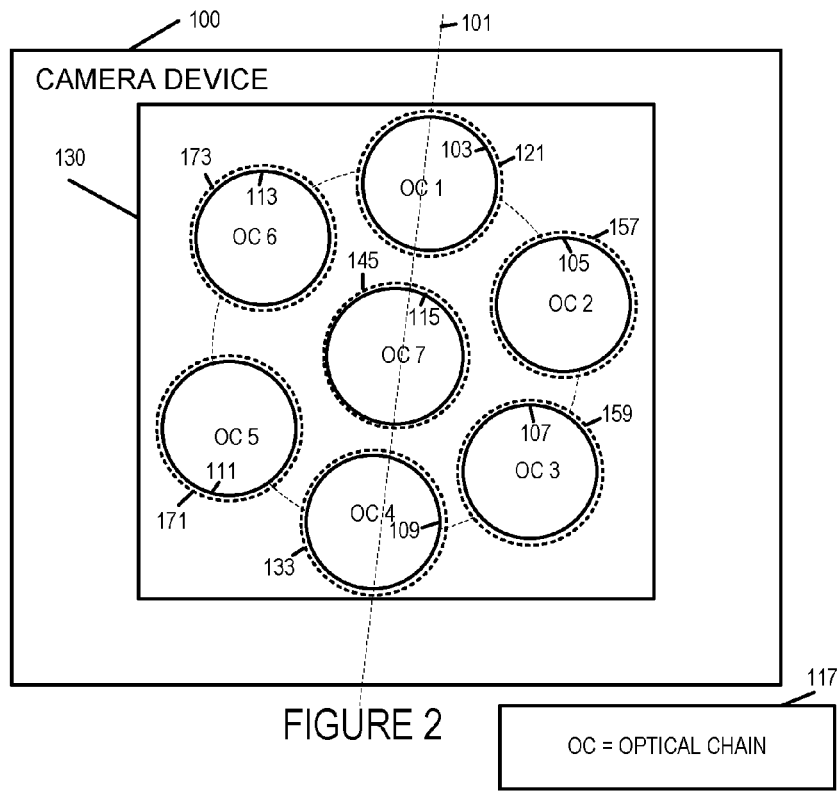
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
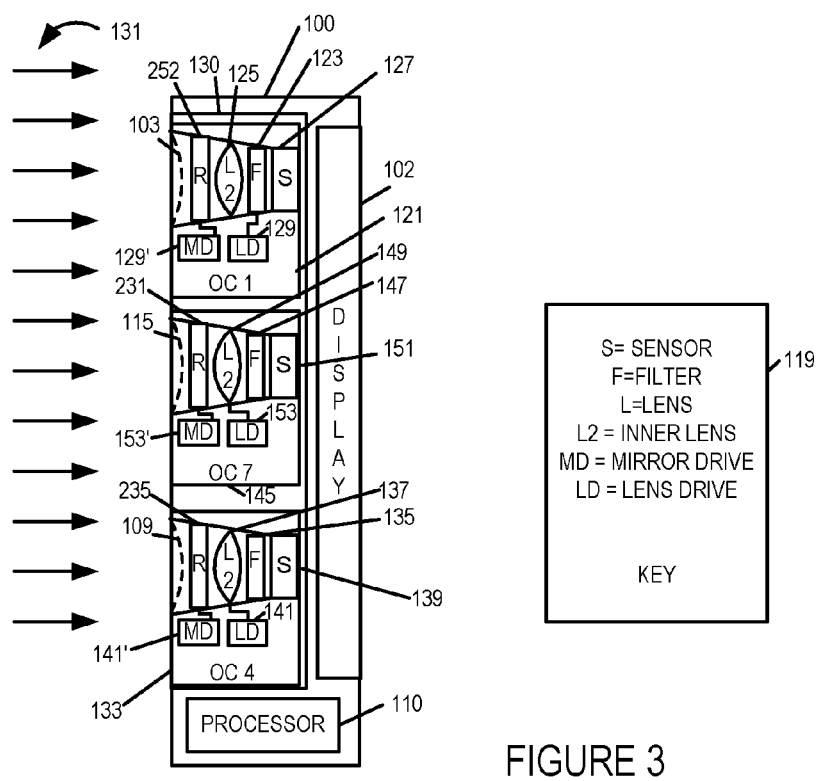
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes and a mirror drive (MD) 129' for controlling the positioning of the light reflection element 252 as desired to deflect light. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149 and a and a mirror drive (MD) 153' for controlling the positioning of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235. The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 and FIG. 13A show optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

While seven optical chains are shown in FIG. 2, it should be appreciated that other numbers of optical chains are possible. For example, as shown in FIG. 7, seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4A:
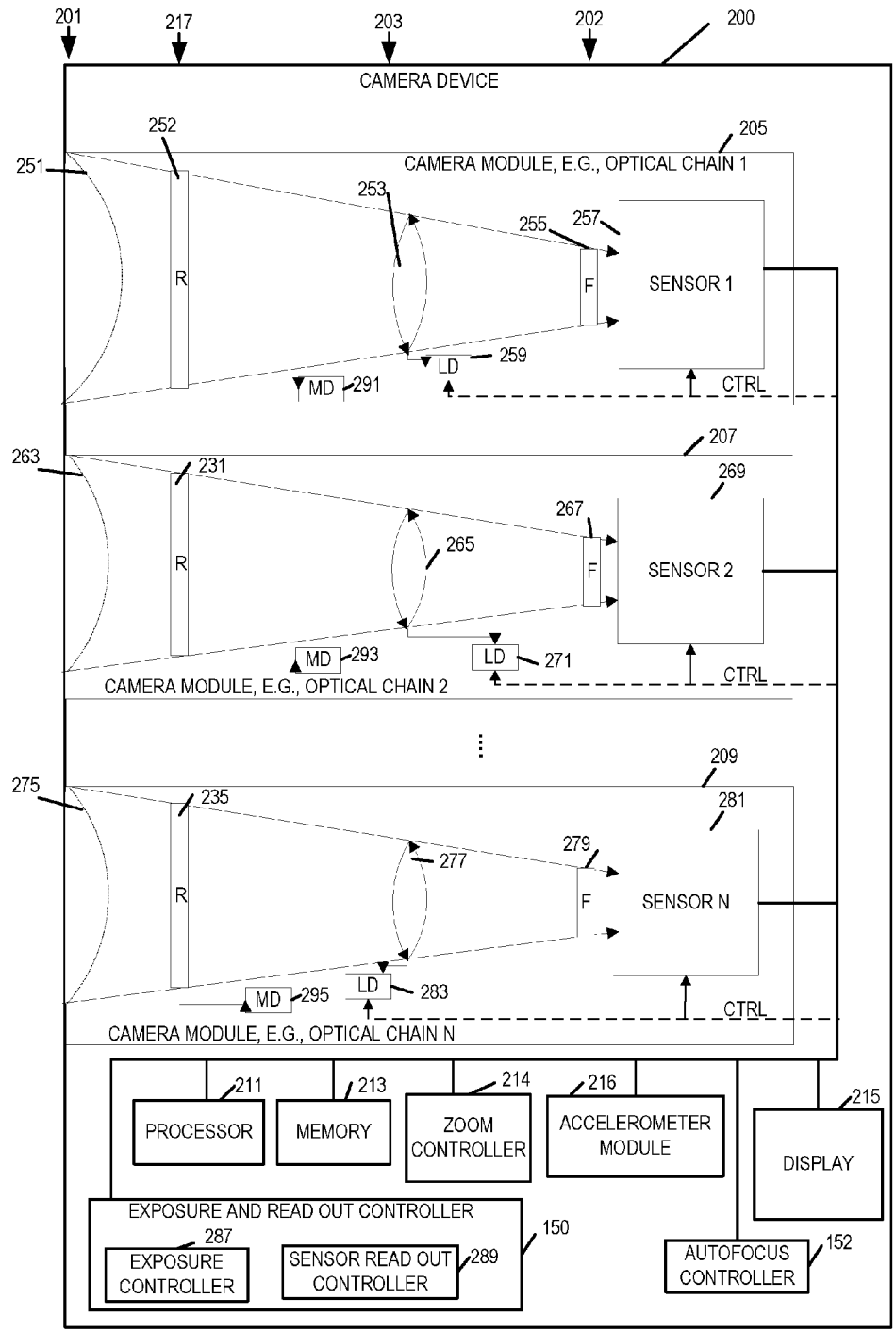
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209, a processor 211, memory 213 and a display 215, coupled together. OC 1 205 includes outer opening 251, a light redirection element R 252, a hinge (or mirror) drive MD 291, an inner lens L2 253, a filter 255, sensor 1 257, and LD 259. The MD 291 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

Figure 4B:
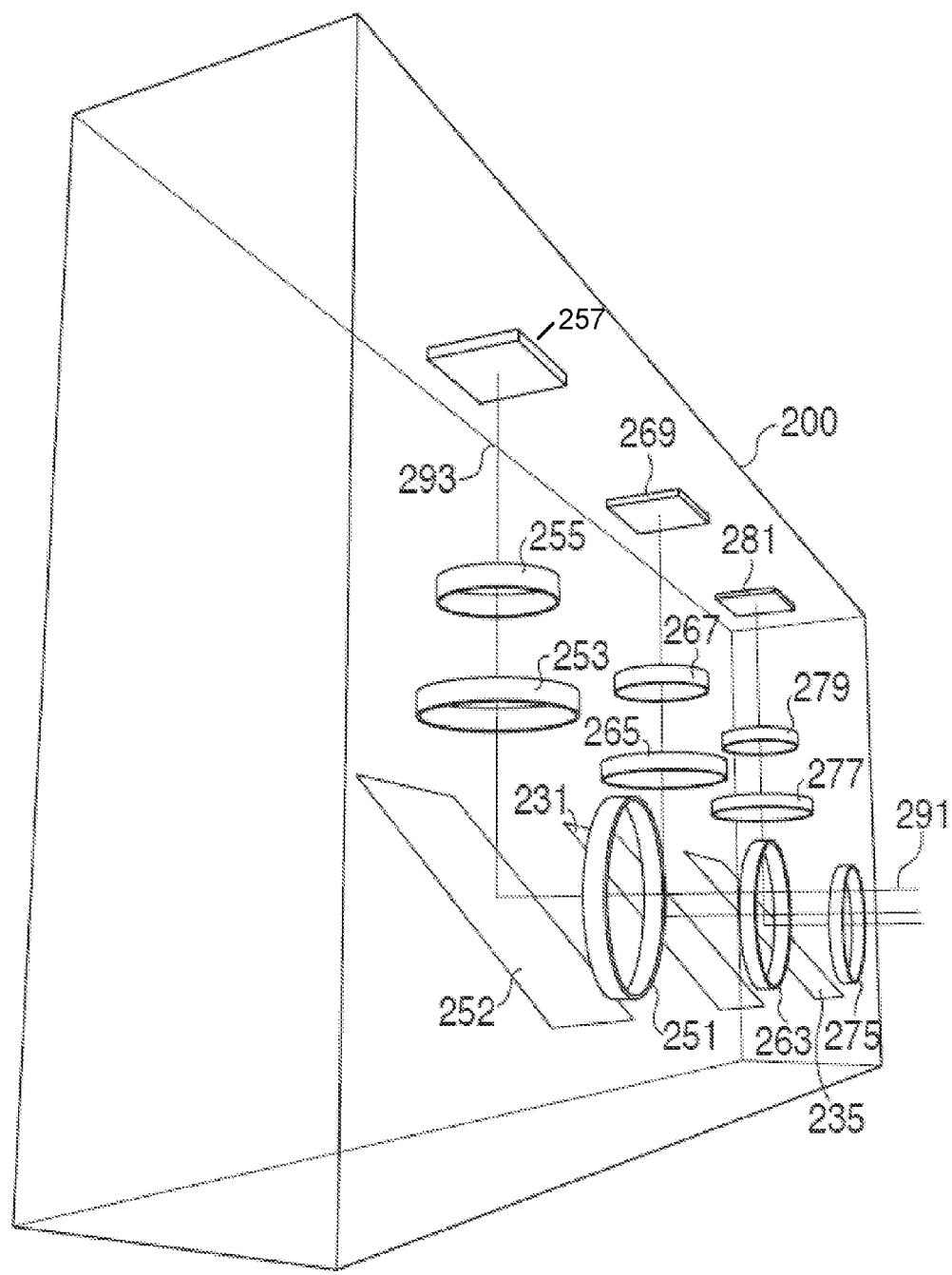
FIG. 4B illustrates the optical chains of the camera device shown in FIG. 4A, as implemented in one particular exemplary embodiment, in greater detail.
Figure 5:
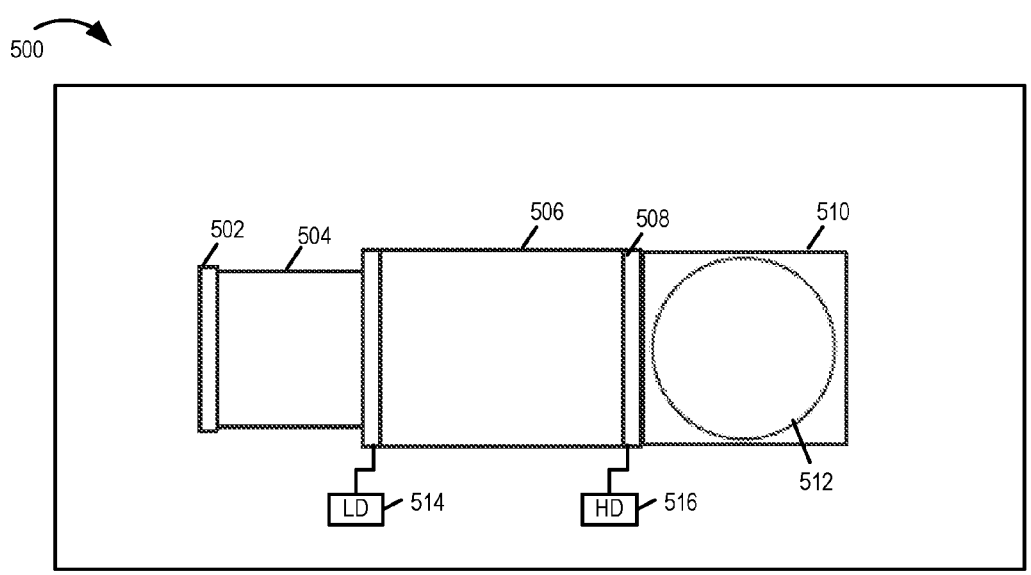
FIG. 5 illustrates an exemplary optical chain, e.g., camera module, which may be used as one of the optical chains included in the camera device of FIG. 1, FIG. 6, FIG. 7 or various other embodiments.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer opening 263, light redirection device 231, mirror drive 293, inner lens 265, filter 267, sensor 2 269, and LD 271. OC N 209 includes outer opening 275, light redirection device 235, mirror drive 295, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 shows an optical chain, e.g., camera module, 500 which is used in various exemplary embodiments. A plurality of optical chains of the type illustrated in FIG. 5 may be used in a camera device such as camera 600 discussed in detail below. The camera module 500 is an optical chain that includes an assembly of different elements integrated together to form the camera module. As illustrated, camera module 500 includes a mirror assembly 520, an optical lens assembly 522 and a filter and sensor assembly 524. The mirror assembly 520 of the camera module 500 includes an outer opening 512 which maybe covered by a flat glass/plastic plate, a light redirection device, e.g., mirror, 510 positioned behind the opening 512, and a mirror hinge 508. The mirror hinge 508 is coupled to the mirror drive (MD) 516. The optical elements assembly 522 of the camera module 500 includes a first cylindrical module portion 506 and a second cylindrical module portion 504, with the optical elements assembly 522 being coupled to a lens drive 514. The filter and sensor assembly 524 of the camera module 500 includes a filter mounted on a filter mount 501 and a sensor 502 placed on a mounting board 515. Light enters the optical chain 500 via the opening 512 and is redirected by the mirror 510 so that it reaches the sensor 502 at the back of the optical chain. The first and second cylindrical portions 504, 506 can house one or more lenses and in some cases filters as well as other optical components through which light may pass before reaching the sensor 502. While the mirror 510 is normally used to redirect light 90 degrees so that light entering through the opening 512 (which may be positioned on the face of the camera) along it's optical axis will be redirected along the optical axis of Part B of the optical chain 500 so that is travels towards the side of the camera allowing for the optical chain 500 to effectively use the side to side distance of the camera device in which the optical chain 500 is mounted, the mirror drive 516 may move the position of the hinge 508 and thus the mirror 510 to alter the angle of redirection so that it varies from 90 degrees. Thus, the direction in which the optical chain 500 effectively points may be altered by moving all or a portion of the hinge 508 and mirror 510. In some embodiments, the axis of the hinge is perpendicular to the Part B of the optical axis and parallel to the place of the front face of the camera 600. In some embodiments, the opening 512 is covered with a plane glass with no optical power.

The MD 516 may be implemented using a motor or other mechanical mechanisms which can be used to drive or change the position of the mirror 510 and/or hinge 508 which connects the mirror to the other components of the camera module such as cylindrical portion 506.

The cylindrical or barrel portions 504, 506 of the optical elements assembly 522 may be moved by lens drive 514 so that they slide relative to each other, e.g., barrel portion 504 may be moved so that it moves further into or out of the barrel portion 506 thereby altering the distance from the opening 512 to the sensor 502 as part of a focus or zoom operation.

It should be appreciated that the optical chain 500 allows for relatively long optical chains to be positioned in a camera device which has a depth which is less than the overall length of the optical chain 500. The camera module 500 is particular well suited for implementing camera devices which include multiple optical chains but which are still intended to be relatively thin to facilitate storage in a pocket or other storage device.

Figure 6A:
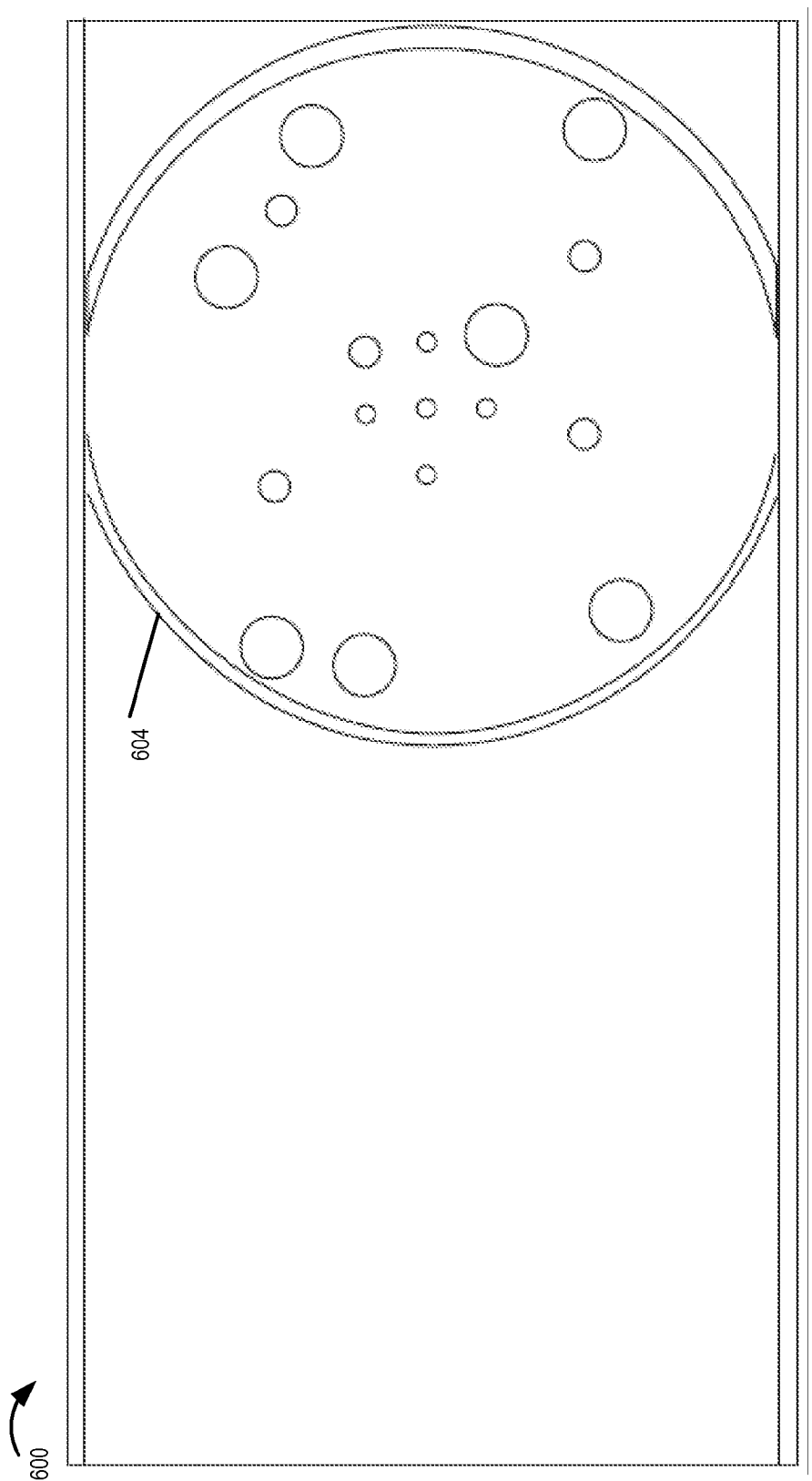
FIG. 6A is an illustration of an exemplary camera including multiple optical chains in accordance with one feature of the invention showing the arrangement of the lenses of individual camera modules.

FIG. 6A is a frontal view of the camera device 600 and the optical chain arrangement of the camera device with the 15 outer openings being clearly visible as circles in the lens area 604. Note that the diameter of the smallest lenses is "d" which correspond to the camera modules having the smallest focal length, the medium focal length modules have a diameter 2d, and the camera modules having the largest focal length have a diameter 4d. This results in the camera modules having the same 'f stop' or 'f number' given the focal length relationship f1 being ¼ the largest focal length (f3) and one half the focal length of the medium focal length f2 of the camera modules having a medium focal length. The 'f number' is the ratio of the focal length to the aperture diameter and determines the diffraction limit of the camera modules. The smaller the f number, the less likely it is that the camera module will be diffraction limited. Smaller f numbers usually corresponded to larger optical complexity in the camera module. Small lenses with 5 or 6 molded plastic elements these days can be manufactured in a cost effective manner for f numbers around 2.4. Accordingly, in some embodiments plastic lenses made of multiple plastic elements are used.

Figure 6B:
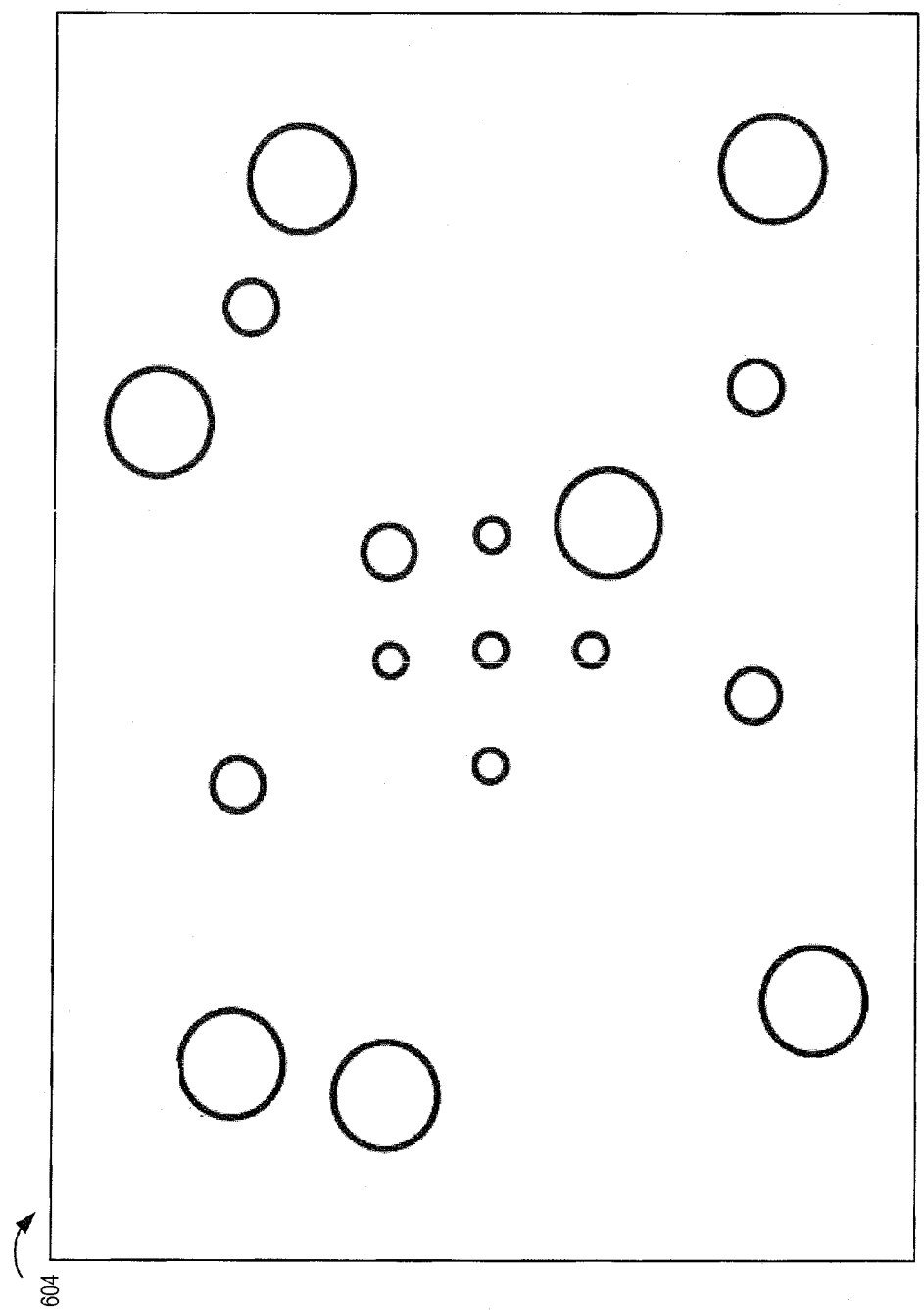
FIG. 6B illustrates the arrangement of lenses of individual optical chains in the camera device shown in FIG. 6A allowing for better appreciation of the arrangement of lenses on the front of the camera device.

FIG. 6B shows an enlarged version of the optical chain arrangement of the camera 600 as viewed from the front. In FIG. 6B the outer openings of the three different sizes can be clearly seen with the largest diameter openings corresponding to camera modules having the largest focal length and thus zoom, e.g., magnification.

FIG. 7 is a diagram 700 showing how the 17 optical chains, e.g., camera modules, of the camera 600 can be arranged within the body of the camera 600. The seven optical chains 1202, 1206, 1210, 1212, 1216 1220, 1222 with the largest lenses and largest supported focal lengths are implemented using optical chains of the type shown in FIG. 5. Similarly, the five camera modules 1204, 1208, 1214, 1218, 1224 with the medium diameter lenses and medium supported focal lengths are also implemented using optical chains of the type shown in FIG. 5. The five optical chains 1226, 1228, 1230, 1232 and 1234 having the smallest diameter outer openings, e.g., light entrance openings, and smallest focal lengths are implemented using optical chains which do not use mirrors and extend straight toward the back of the camera. Optical chains of the type used in the FIG. 3 embodiment may be used for the optical chains 1226, 1228, 1230, 1232 and 1234. However, it should be appreciated that optical chains of the type illustrated in FIG. 5 maybe and in some embodiments are, used as the optical chains 1226, 1228, 1230, 1232 and 1234.

From the FIG. 7 example which may be considered as a frontal view with the front of the camera housing removed to allow viewing of the camera modules, it can be seen how a larger number of camera modules can be incorporated into a single camera device 600 allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 600.

In some embodiments the elements included in the optical chains 1202, 1206, 1210, 1212, 1216, 1220, 1222, 1204, 1208, 1214, 1218, 1224 are similar to those discussed above with regard to FIGS. 4B and 5. While the elements included in the optical chains 1226, 1228, 1230, 1232 and 1234 are also similar to those discussed above with regard FIGS. 4B and 5 but without a redirection element and mirror drive assemblies. As discussed with regard to FIG. 4B, an optical chain such as the optical chain 1202 (or OCs 1206, 1210, 1212, 1216, 1220, 1222, 1204, 1208, 1214, 1218, 1224), that has a light redirection element, such as the element 1205, can be divided, for purposes of discussion, into two parts. The optical axis of the optical chain 1202 as seen from outside of the front of the camera is the optical axis of a first part (entering the OC from the front of the camera 600 via the outer opening). Light traveling into the optical chain 1202 along the optical axis is redirected by the redirection element included therein, e.g., mirror, and traverses a second part of the first optical chain 1202 and reaches the sensor. The other optical chains OCs 1226, 1228, 1230, 1232 and 1234 (smallest focal length (f1) OCs) while each having an outermost opening through which light enters, the OCs 1226, 1228, 1230, 1232 and 1234 do not have light redirection elements. In some embodiments the OCs 1226, 1228, 1230, 1232 and 1234 each has an optical axis which is perpendicular to the front face of the camera 600.

Light enters each of the OCs 1202, 1206, 1210, 1212, 1216, 1220, 1222, 1204, 1208, 1214, 1218, 1224 via their respective outer opening and is redirected by their respective redirection elements so that it reaches the respective sensors at the back of each of the optical chains. In many cases the outer opening through which the light enters the OC is referred to as the entrance pupil via which the light enters. For example, light entering through outer opening of the optical chain 1202 (e.g., from the front of the camera 600) is redirected by a mirror so that it passes through a first inner lens, a second inner lens and a filter as it travels towards sensor. More or less number of elements, e.g., lenses, filters etc., may be included in each of the OCs in some embodiments. Different optical chains may use different lenses while still using a sensor of the same shape and/or resolution as the other optical chains in the camera device 600.

It should be appreciated that the light redirection elements, e.g., such as a hinged mirror or other light redirection device such as a prism, positioned behind the entrance pupil or opening of an OC can be moved and/or rotated which results in changing of the optical axis of the OC seen from outside the outer openings of the corresponding OC. That is the optical axis of an optical chain as seen from outside the camera can be changed by controlling the light redirection elements of the corresponding OC. Thus it should be appreciated that in some embodiments by controlling the light redirection element such as the mirror placed behind the outer opening in the corresponding optical chains, the optical axes can be changed such that the optical axes of one or more OCs are not parallel to each other. The ability to change the optical axis of the optical chain by controlling the movement of a mirror, provides the same effect as if the camera is being pointed in a given direction, e.g., to take pictures in that direction, and thus provides the ability to capture images from different perspectives without actually moving the camera device.

Note that the relative position of the outer openings of the camera modules shown in drawing 1200 are known and fixed in some embodiments. However, in some embodiments the modules 1204, 1208, 1218, 1214 and 1224 are the same or similar in there elements and function to the module 500 in FIG. 5 which includes a mirror 510 that can be driven, e.g., moved or rotated by the hinge (mirror) drive 516 to change the angle of the mirror 510. While the mirror drive 516 can rotate the mirror around the hinge axis and thus change its angle, the hinge 508 prevents motion in other directions and thus the optical axis (outside the camera) rotates in a plane perpendicular to the axis of the hinge. When the mirror 510 is at a 45 degree angle, the light entering the opening 512 along it's optical axis is deflected 90 degrees into the optical axis of Part B of the module 500. While we describe here a mirror 510 that is hinged and can rotate along an axis, in some other embodiments the place of the mirror is moved to a different plane such that this motion is not constrained to be rotation along any fixed axis. In this case the optical axis of the camera module can be made to point in any desired direction (towards any point in the scene of interest).

While some modules use mirror that are movable and hinged, in other embodiments one or more of the camera modules are implemented with fixed position mirrors allowing the moveable hinge 508 and mirror drive 516 to be omitted. For example, in one embodiment the camera modules used to capture the full scene area of interest have fixed mirrors while the camera modules used to capture small portions of the scene area of interest each include a movably hinged mirror. While combinations of camera modules with some having fixed mirrors and others having movable mirrors can be used, in at least one embodiment each of the multiple camera modules included in an exemplary camera device have movable mirrors.

The mirror/hinge drive 516 is controlled by the processor 110 depending on the particular mode of camera operation. Thus, when a user selects a first mode of operation one or more camera modules may have their mirrors at a first angle while during another mode of operation, e.g., a module in which images are to captured and combined as shown in FIG. 34, one or more camera modules will have their mirror driven to a different position under control of the processor 110. The particular mode of camera device operation may be determined based on user input by the processor 110 operating under control of the mode control module 117 or directly by the mode control module 117 when the mode control module is implemented in hardware.

If mirrors in each of 1204, 1208, 1218, 1214 and 1224 are at 45 degrees, each module looks directly out of the front face of the camera and their optical axes are all parallel. In this case each of the modules will take an image of the same scene area, e.g., the scene area 910 of FIG. 9. To capture an image of the second scene area with module 1204, the hinged mirror 510 of module 1204 is adjusted so that the optical axis of camera module 1204 points towards the center of the second scene area 3206. Note that the module 1204 is positioned in the camera 1200 in such a manner that as the mirror is rotated/moved relative around the hinge, the location in the scene area of interest 802 that the optical axis points to moves along the diagonals of the rectangle 802. Similarly, the mirror for camera module 1214 is adjusted to capture the fifth scene area. Note that in FIG. 7, camera modules 1204, 1214 are arranged proximate, e.g., along or adjacent, one diagonal while camera modules 1208, 1218 are located proximate, e.g., along or adjacent, the other diagonal. Rotating the mirror in 1214, e.g., changing the angle and thus incline of the mirror, makes the module's optical axis move along the corresponding diagonal. Mirrors of modules 1208 and 1218 are similarly angled, e.g., rotated, to capture images of the other scene areas respectively. The module 1224 used to capture the sixth image area 910 points at the center of the scene area of interest 802 so it's mirror is maintained at 45 degrees.

It should be appreciated from the above discussion that it is particularly beneficial to have at least some camera modules arranged along diagonals. These modules have the Part B of their optical axis parallel to one of the two diagonals. Thus, the arrangement of modules 1210, 1220, 2202, 1212 with the largest apertures along diagonals and also the arrangement of medium aperture modules 1204, 1214, 1208, 1208 along the same diagonals but offset from the other modules for space reasons, is an intentional design choice because it facilitates image capture and combining in some embodiments and modes of operation.

In some embodiments the camera 600 includes a processor (e.g., processor 110, 211) configured to generate a composite image by combining at least a first and a second image. In some embodiments the processor is configured to generate the composite image from first, second, third, fourth, fifth and sixth images. In some embodiments the processor is configured to generate the composite image from the first, second, third, fourth, fifth, sixth and seventh images. In some embodiments the processor is further configured to control storage of the generated composite image in the device memory, e.g., memory 108, and/or output of the composite image on a display, e.g., display 102, and/or transmission of the captured images or the composite image to another device via an interface such as interface 114.

Figure 8:
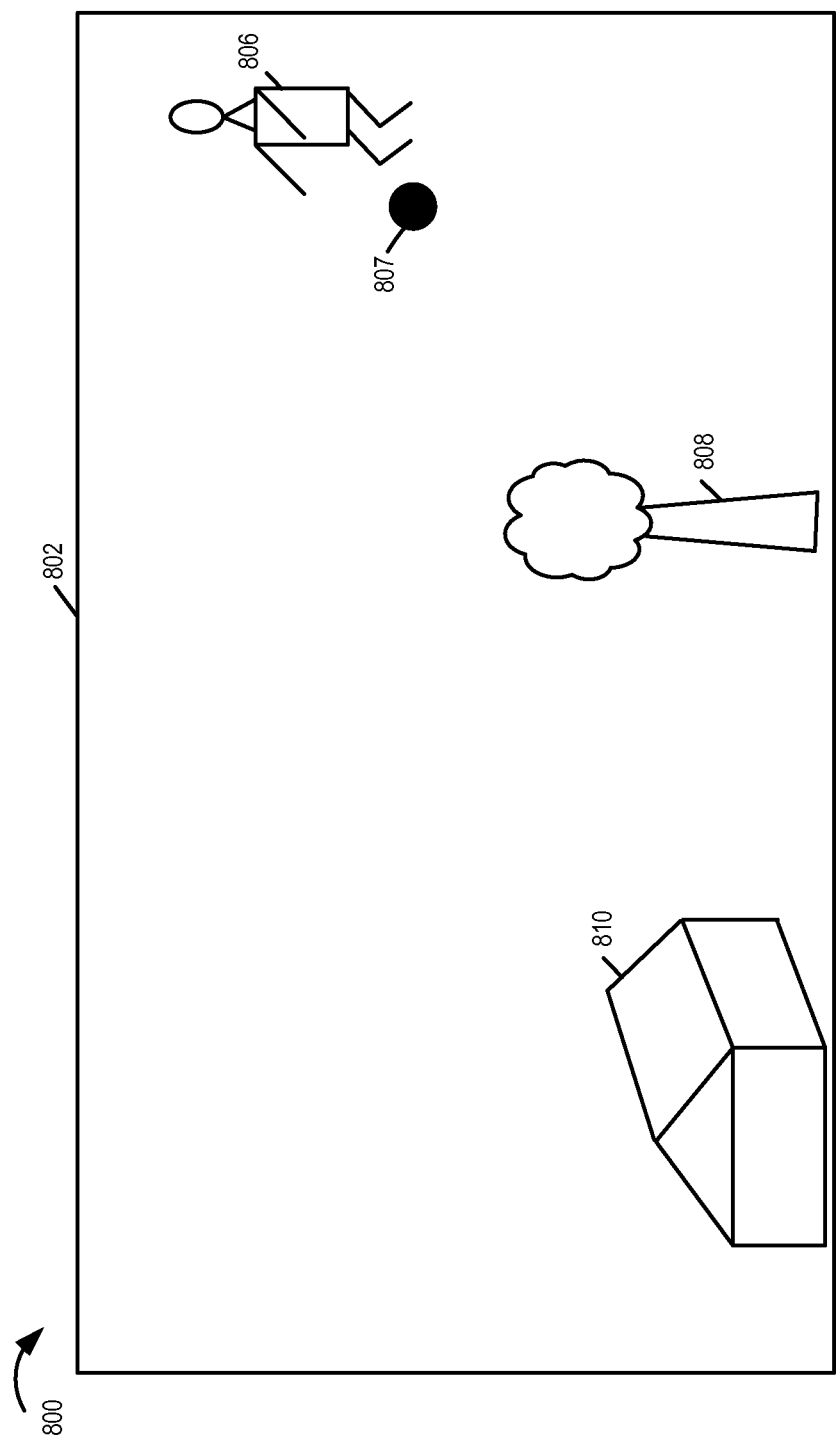
FIG. 8 shows an exemplary scene including a scene area which may have its image captured by camera modules of a camera implemented in accordance with one or more embodiments of the invention.

FIG. 8 is a drawing 800 illustrating an exemplary scene area 802 which may have all or portions of its image captured by camera modules of a camera implemented in accordance with one or more embodiments of the invention. Scene area 802 includes multiple objects at least some of which are stationary while others are in motion. In the example, the scene area 802 includes one or more objects, e.g., a person 806 playing with a ball 807, a tree 808 and a house 808. In the example, while the portions of the scene area 802 including the tree 808 and the house 808 remain static without motion, the portion of the scene area 802 including the person 806 playing with a ball 807 has motion, e.g., person 806 running with the ball 807 rolling. Each of the objects in the scene 802 may have a different corresponding depth in the scene 802.

Figure 9:
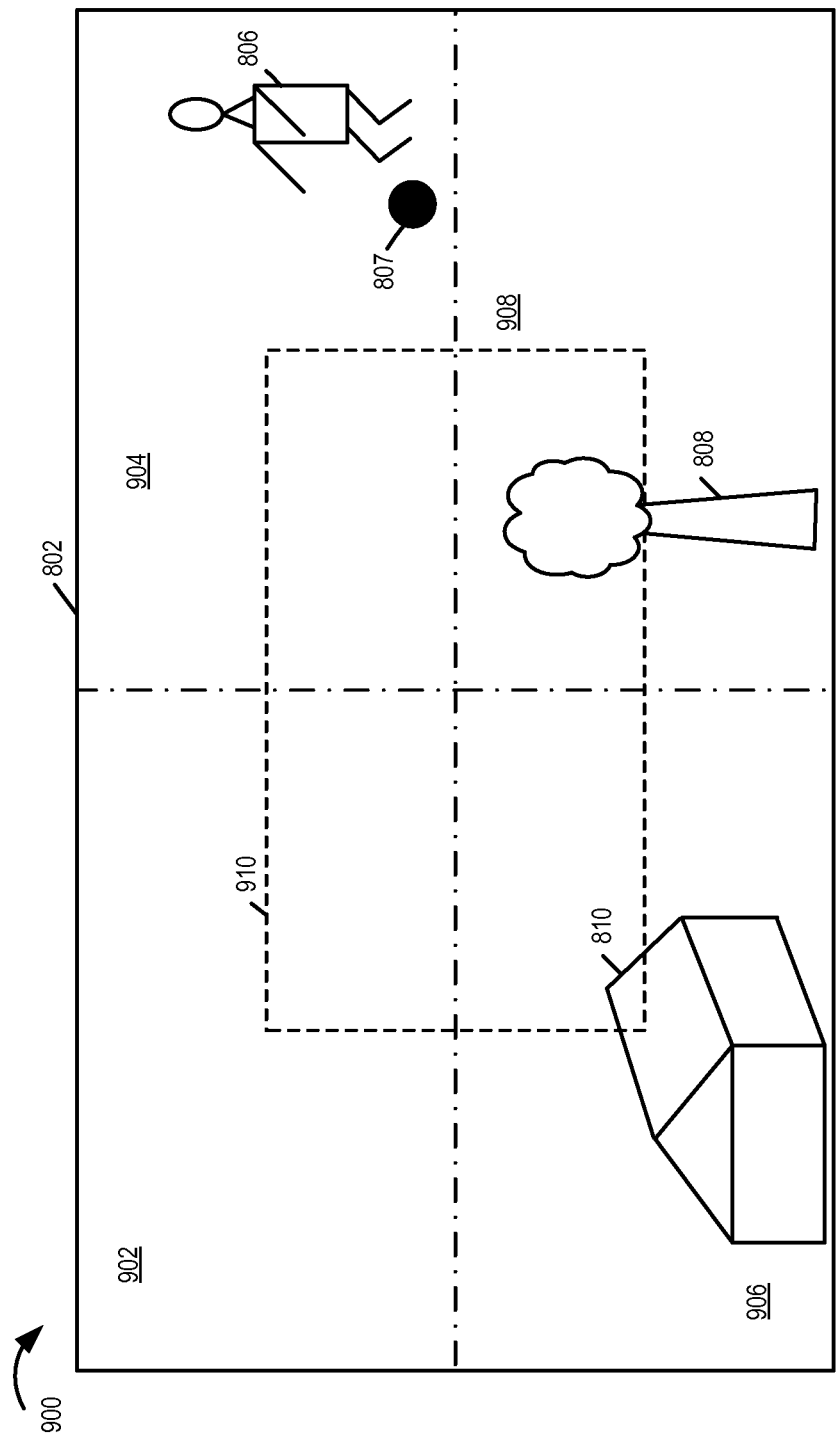
FIG. 9 shows how different camera modules of a camera including multiple camera modules may capture different portions of the scene area of interest shown in FIG. 31.

FIG. 9 is a drawing 900 illustrating conceptually how different optical chains, e.g., camera modules, of a camera, such as the camera device 600 of FIG. 6 which includes multiple optical chains (as shown in FIG. 7), some of which have different focal lengths can capture different size portions of a scene area 802. The different capture sizes corresponding to the various different camera modules correspond to field of view (FOV) of the respective camera modules in some embodiments.

For purposes of discussion, the capture and combining of images corresponding to different scene areas will be explained by referring to FIG. 7 which shows the arrangement of optical chains in camera device 600. Consider for purposes of discussion that the camera device 600 includes the 17 modules arranged as shown in FIG. 7. As previously discussed in the FIG. 7 example, three different focal lengths, f1, f2 and f3 are used where f1<f2<f3; f1 is ½ f2; and f2 is ½ f3 in some embodiments.

For purposes of discussion the first through seventh camera modules 1202, 1206, 1210, 1212, 1216 1220, 1222, respectively, are the modules with the largest lenses (and thus largest apertures in various embodiments) and largest supported focal lengths (f3). For simplicity in the discussion below, it is further assumed that the distances between the various camera modules is much smaller than the distance between the camera and all the objects in the scene. This is however not a limitation of the described invention but meant only to make the explanation easier to follow. In some embodiments the camera device 600 including the optical chains shown in FIG. 7 can be operated in multiple modes, e.g., normal image capture mode or a motion image capture mode. In some embodiments different optical chains use different exposure times selected based on the selected mode of image capture. In some embodiments the exposure time used for a given optical chain is chosen based on the focal length of the optical chain. In some embodiments the larger focal length optical chains, e.g., 1202, 1204, 1206, 1208, . . . , and 1220 with smaller field of view which are used to capture portions of a scene area are controlled to use smaller exposure times as compared to the smaller focal length optical chains, e.g., 1226, 1228, . . . and 1234 with largest field of view which are used to capture the entire scene area are controlled to use larger exposure times.

The five medium sized camera modules which are the 8th through 12th camera modules correspond to reference numbers 1204, 1208, 1214, 1218, 1224, respectively and have medium diameter lenses and medium supported focal lengths (f2). In some embodiments The five camera modules which are the 13th through 17th camera modules correspond to reference numbers 1226, 1228, 1230, 1230 and 1234 and have the smallest diameter lenses and smallest focal length (f1).

It should be appreciated that the camera modules with the largest focal length f3 have a relatively smaller field of view in comparison to camera modules with smaller focal lengths and capture smaller portion of a scene area of interest given that they provide the greatest magnification and details of the captured scene. Assuming that camera modules of the different focal lengths use sensors with the same total pixel count, the modules with the larger focal length (f3) will provide an image with a higher pixel to scene area ratio since more pixels will be used to capture an image of a smaller scene area than will be the case with the medium (f2) and small focal length (f1) camera modules.

It should be appreciated that given the difference in magnification between the modules with different focal lengths (f1, f2, f3) the scene area captured by the small focal length (f1) camera modules will correspond to portion of the scene area of interest which is approximately 16 times the size of the portion the scene area of interest which is captured by the camera modules with the largest (f3) focal length. The portion of the scene area of interest captured by camera modules with the intermediate focal length (f2) will be 4 times the size of the portion of the scene area of interest captured by the camera modules with the largest focal length (f3) and ¼ the size of the portion of the scene area of interest captured by the camera modules with the smallest focal length (f1).

The relationship between the scene areas captured by camera modules corresponding to the f1 and f2 focal lengths can be appreciated in the context of the FIG. 9 example which shows 6 distinct scene areas. In some embodiments f1=35 mm and f2=70 mm.

In FIG. 9 example the entire scene area of interest is identified by reference 802 as used in FIG. 8. The scene area 802 corresponds to the full scene area of interest also shown in FIG. 8. For purposes of explanation consider that the scene area 802 is captured by one or more optical chains having the focal length f1, i.e., by smaller focal length optical chains (1226, 1228, 1230, 1230 and 1234) which have largest field of view compared to other optical chains. Assume for discussion purposes that (f1) camera module 1228 is used to capture the scene area 802 represented by the largest rectangle in FIG. 9. Note that the actual image captured by 1228 may capture a slightly larger scene area to ensure that the scene area of interest is covered.

Further consider that the camera module 1204 having focal length f2 is used to capture a second scene area 902 which is represented by the rectangle in the top left corner in FIG. 9, that camera module 1208 having focal length f2 is used to capture a third scene area 904 represented by the rectangle in the top right corner in FIG. 9, that camera module 1218 having focal length f2 is used to capture a fourth scene area 906 represented by the rectangle in the bottom left corner in FIG. 9, that camera module 1214 having focal length f2 is used to capture a fifth scene area 908 represented by the rectangle in the bottom right corner in FIG. 9 and that (f2) camera module 1224 is used to capture sixth scene area 910 represented by the rectangle with dashed lines in the center portion. Again as with the capture of the other scene areas, the actual images captured by the modules 1204, 1208, 1218, 1214 and 1224 may be of slightly larger scene areas to ensure that the respective scene areas are fully contained in the captured images. In accordance with one aspect of some embodiments, either a user designates areas including motion within the scene of interest, e.g., on generated preview image(s), or the camera device performs motion detection on the image(s) of the scene area, e.g., using generated preview image(s). In either case when it is determined that motion is present in the scene area of interest one or more camera modules which correspond to the portions of the scene of interest with motion are identified and exposure times of such modules which are used to capture scene area portions with motion are determined based on the focal length of the camera modules and/or amount of motion present in the portion of the scene area. In some embodiments the exposure times used for camera modules used to capture scene areas with motion are smaller than the exposure time of camera modules used to capture the overall scene area 802. For instance, in the example of FIG. 9 the portion 904 of the scene area includes motion while other scene portions are relatively static/fixed, e.g., do not include objects which are moving or changing. In this case the camera module 1208 which corresponds to the portion 904 with motion is identified as discussed above and the exposure time used by camera module 1208 to capture images of scene portion 904 is chosen to be less than the exposure time used by other camera modules which capture scene portion with no motion. In some embodiments an exposure time E1 used by an optical chain used to capture the entire scene area 802, e.g., camera module 1228, is greater than or equal to an exposure time E2 used by optical chains capturing portions 902, 906 and 908 which is still greater than an exposure time E3 used by the optical chain capturing scene portion 904 with motion, i.e., E1≥E2>E3.

In the FIG. 9 example, 6 distinct scene areas are shown for purposes of explaining some aspects and features of the invention. Each of the 6 scene areas may be, and in some embodiments is, captured by a different optical chain of the camera device 600 shown in drawing 700 prior to being combined. The camera modules, as will be discussed below, can capture images at the same time, e.g., in parallel. However, in some embodiments where rolling shutters are used the camera modules are controlled to capture portions of the scene area of interest in a synchronized manner so that all the different camera modules which capture a given portion of a scene area of interest will capture the given portion at the same time.

It should be appreciated that by combining images corresponding to the different scene area portions shown in FIG. 9 to generate a composite image, it is possible to generate a composite image with four times the pixel count of a single image sensor. For example, if each of the image portions is captured by a camera module using an 8 mega pixel sensor, the composite image corresponding to the scene area of interest shown in FIG. 9 would have an overall pixel count of 32 megapixels since the second, third, fourth and fifth scene area would each be captured by a different 8 megapixel sensor and thus contribute 8 megapixels to the composite image. The actual resolution could be slightly lower if the captured images are slightly larger than the corresponding scene areas.

While the sensors used to capture the first and fourth scene areas are not likely to result in an increase in the overall pixel count of the composite image since they correspond to the same image area as that captured by the combination of sensors used to capture the second, third, fifth and sixth scene areas, they provide for increased light capture than would be possible without the use of the f1 lenses and also provide important information which allows for the generation a depth map and which provide images of the overall scene area which can be used in aligning and stitching together the images corresponding to the second, third, fifth and sixth scene areas as part of the process of generating the composite image.

In some embodiments the large focal length (f3) camera module, e.g., 1216, is used to capture the image of the center portion of the area of interest such that its center coincides with the center of the image area of interest. Since practically most lenses have the least aberrations and best image quality at the center of their field of view, this ensures that the center of the scene area of interest is imaged at high quality by the camera module of large focal length capturing center portion. The imaging of the scene area corresponding to the center portion of the scene of interest 802 also increases the total amount of light energy captured at the center of the scene area of interest. This allows the composite image generated from the captured images to have its best quality (high resolution and minimum noise) at the center of the scene area of interest.

The above discussed image capture operations performed by various sensors included in corresponding optical chains as discussed above may, and in some embodiments is, performed by a camera such as camera 600 including optical chains arranged as illustrated in FIG. 7.

Figure 10A:
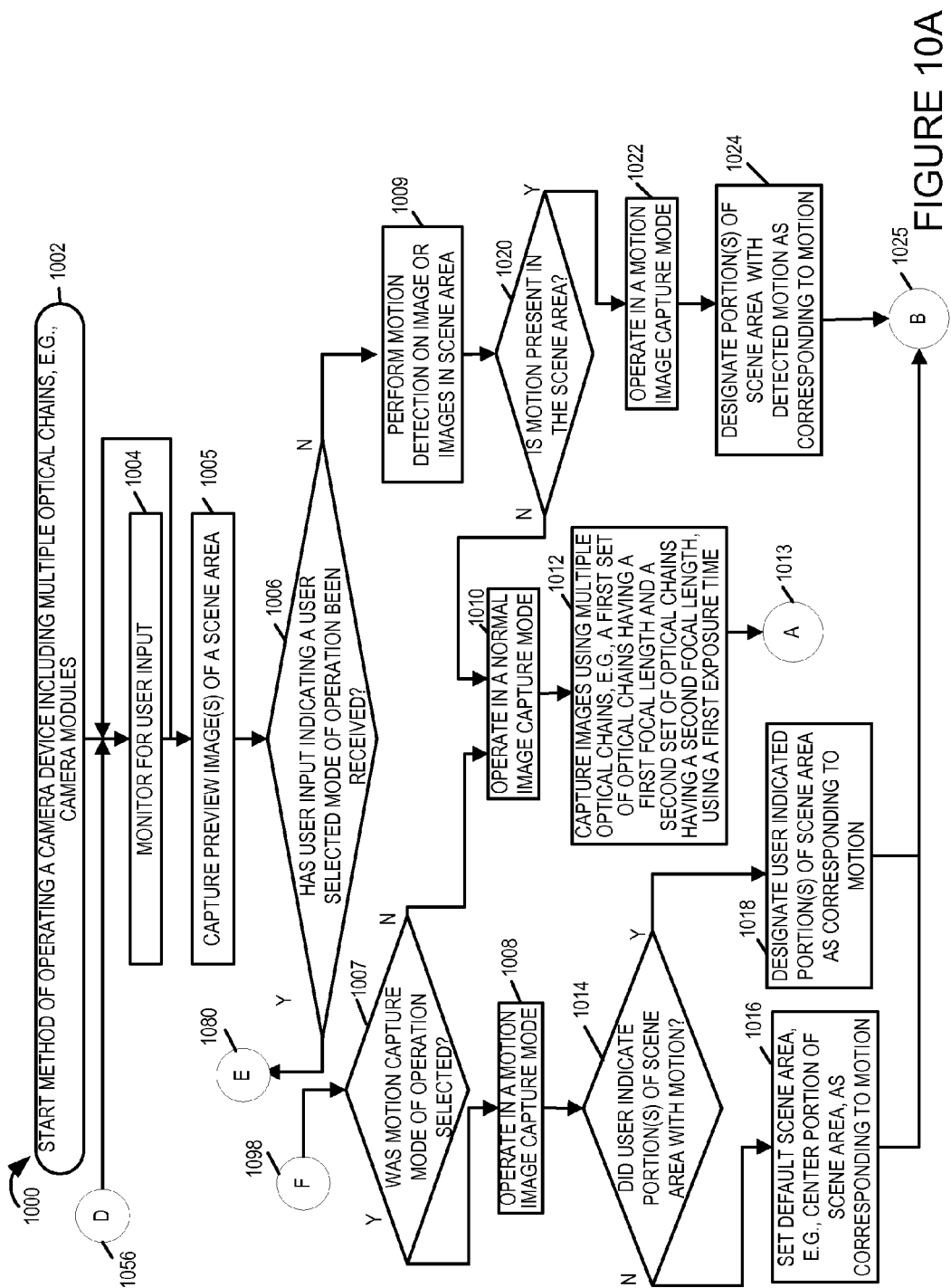
FIG. 10A is a first part of the flowchart of FIG. 10 showing the steps of an exemplary method of capturing images using multiple camera modules in accordance with one exemplary embodiment.
Figure 10B:
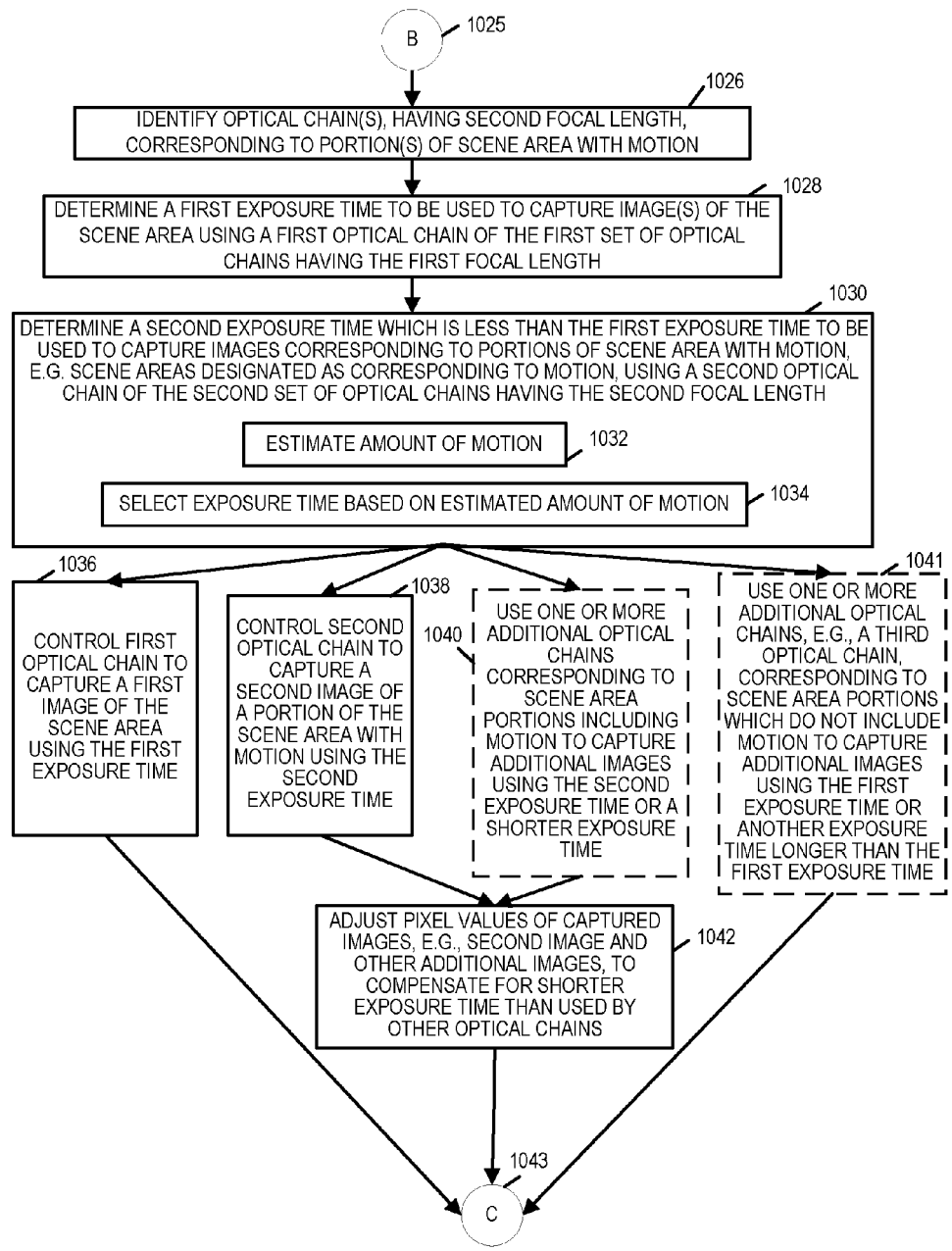
FIG. 10B is a second part of the flowchart of FIG. 10 illustrating the steps of an exemplary method of capturing images using multiple camera modules.
Figure 10C:
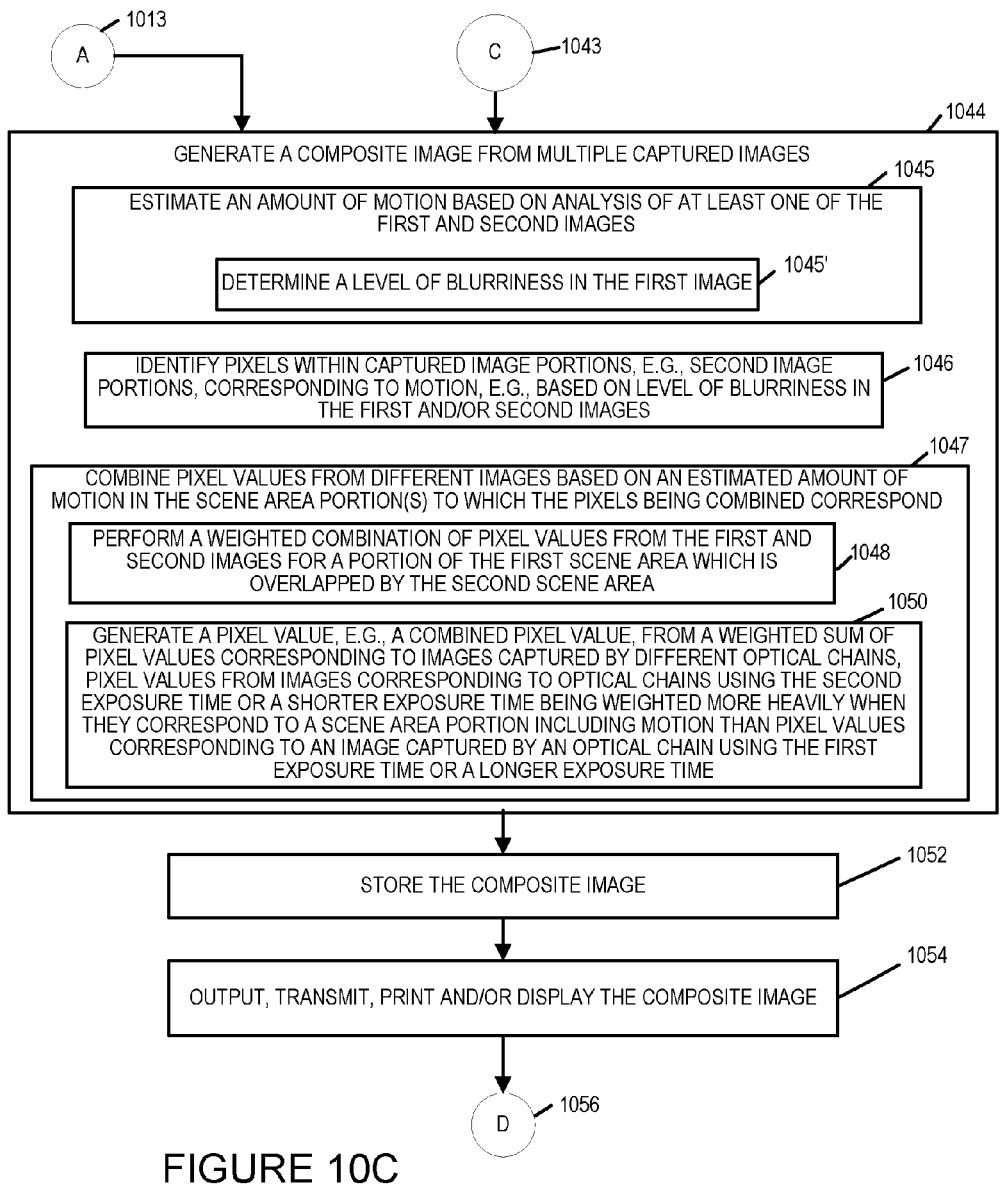
FIG. 10C is a third part of the flowchart of FIG. 10 illustrating the steps of an exemplary method of capturing images using multiple camera modules, with FIG. 10 comprising the combination of FIGS. 10A, 10B, 10C and 10D.
Figure 15:
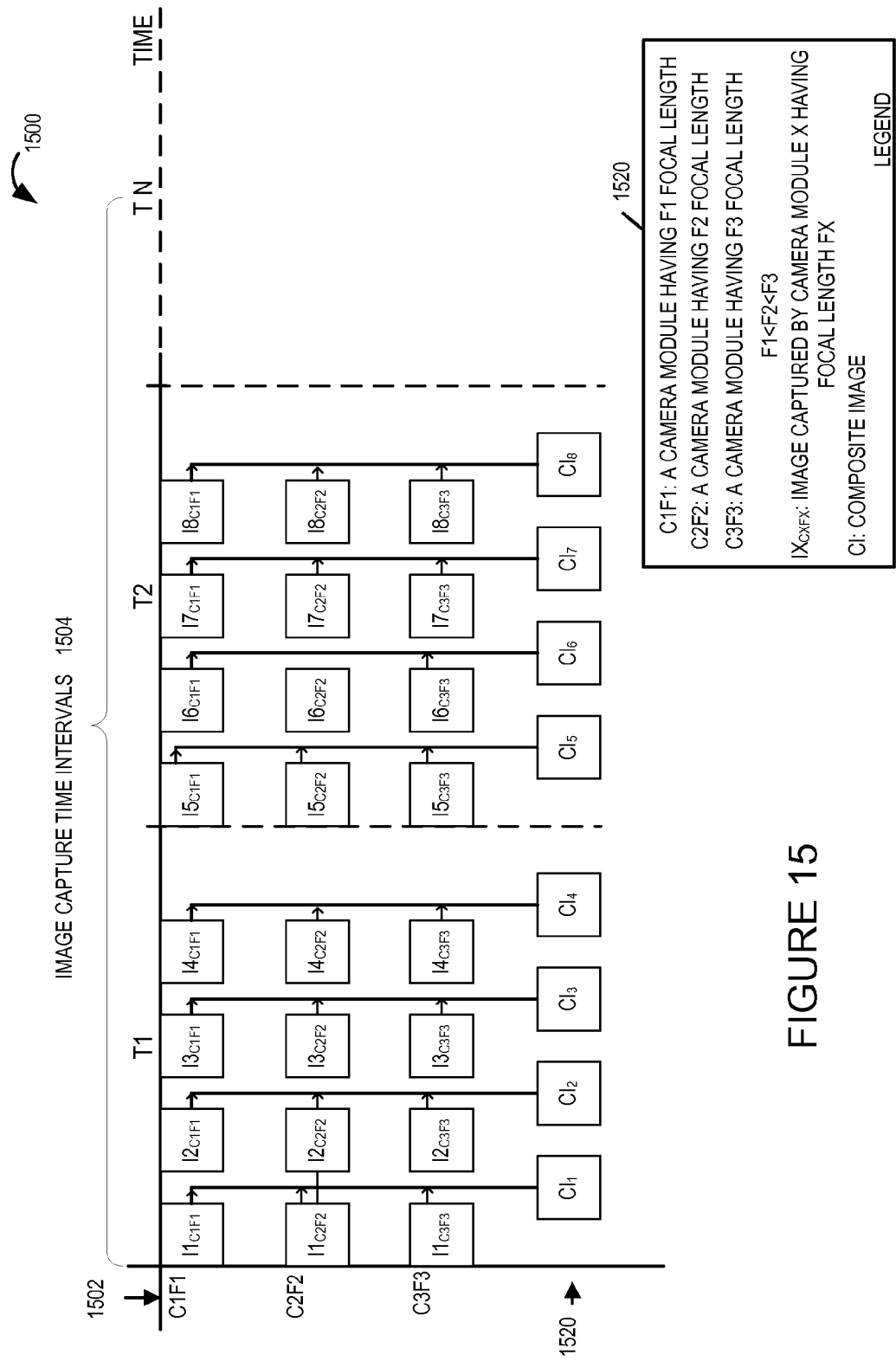
FIG. 15 illustrates a normal burst and/or video mode of operation in which images are captured over time and a stream of composite images is generated.

FIG. 10, which comprises a combination of FIGS. 10A and 10B, illustrates a flowchart 1000 showing the steps of the exemplary method of operating a camera device including multiple optical chains to capture images in accordance with one exemplary embodiment. The camera device 100/200 which can be used to implement the methods of the present invention including the steps discussed with regard to flowchart 1000. The method starts in step 1002, e.g., with the camera device being powered on and initialized. The method proceeds from start step 1002 to step 1004. In step 1004, which is part of the initialization operation in some embodiments, the camera device monitors for user input, e.g., to detect an input via a touch sensitive display screen and/or a control button. In various embodiments the monitoring is performed on an ongoing basis. Operation proceeds from step 1004 to step 1005. In step 1005 the camera device takes preview image(s) of a scene area for displaying it to the user on the display screen. Operation proceeds from step 1005 to step 1006. In some embodiments step 1006 is performed in response to the monitoring detecting receipt of a user input. In step 1006 it is determined whether a user input indicating a user selected module of camera operation has been received. If it is determined that a user input indicating a user selected mode of operation has been received the operation proceeds from step 1006 to step 1082 (shown in FIG. 10D) via connecting node E 1080. In step 1082 a check is made to determine whether the received user input indicates tha the user selected a normal burst mode of operation. If a user selected a normal burst mode of operation, operation proceeds to step 1084 in which a normal burst mode of operation is implemented. Step 1084 may be implemented by a call to a normal burst mode routine which controls the camera device to implement a normal burst mode of operation. FIG. 15 shows how images may be captured during sequential image capture time intervals during a normal burst mode of operation using at least 3 different camera modules with different focal lengths. Operation proceeds from step 1084 to step 1994 via connecting node D 1056. The step 1007 otherwise the operation proceeds to step 1009.

Figure 16:
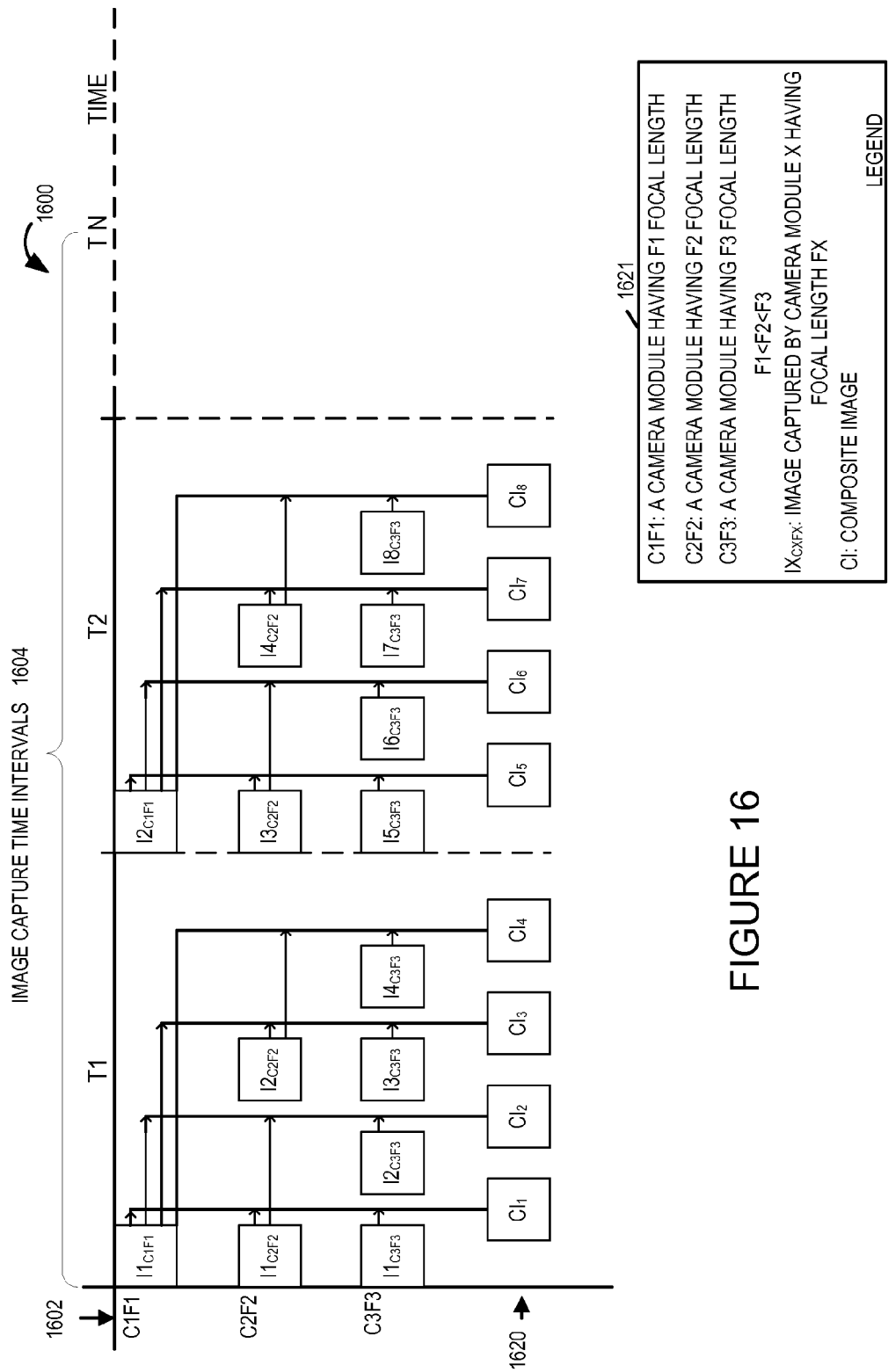
FIG. 16 illustrates a reduced data burst and/or video mode of operation in which images are captured over time and a stream of composite images is generated.

If in step 1082 it si determined that a normal burst mode of operation was not selected by the user, operation proceeds to step 1088. In step 1088, a check is made to determine if a reduced data burst mode of operation was selected by the user. If the user selected a reduced data burst mode of operation, operation proceeds to step 1090. In step 1090, a reduced data burst mode of operation is implemented. Step 1090 may be implemented by a call to a subroutine such as the one shown in FIG. 17 which implements a reduced data burst mode of operation. The method shown in FIG. 17 will be discussed further below. The reduced data burst mode of operation may result in images being captured and combined to generate a set, e.g., stream, of composite images as shown in FIG. 16. The mode of operation can be changed by user input. Accordingly, operation is shown proceeding form step 1090 to step 1004 via connecting node D 1056 to indicate that user input maybe received and processed resulting in a change of the mode of operation.

If in step 1088 it was determined that a reduced data burst mode of operation was not selected by the user, operation proceeds via connecting node F 1098 to step 1007 shown in FIG. 10A.

In step 1007 it is determined if a motion capture mode of camera operation has been selected by the user, e.g., based on the received user input. Based on the determination, in step 1007 it is decided whether the camera device is to be operated in a motion mode or non-motion mode of camera operation. If in step 1007 it is determined that the motion capture mode of camera operation is not selected the operation proceeds from step 1007 to step 1010. In step 1010, following the determination in step 1007 that the motion capture mode has not been selected a normal capture mode, e.g., a non-motion mode, of camera operation is selected for the camera operation. Operation proceeds from step 1010 to step 1012. In some embodiments step 1012 may include a plurality of steps of operating multiple optical chains, e.g., camera modules, to capture images. In step 1012 multiple optical chains in the camera device are operated to capture images corresponding to the scene of interest using the same exposure times during the normal mode of operation. In some embodiment this includes controlling a first set of camera modules having a first focal length (f1) and a second set of camera modules having a second focal length (f2) which is greater than the first focal length, i.e., f2>f1, to capture images using the same exposure times. In some embodiments the higher focal length (f2) camera modules are used to capture images of portions of the scene of interest, e.g., such as areas 902, 904, 906, 908, while smaller focal length (f1) camera modules are used to capture images of the entire scene of interest, e.g., such as area 802. In some embodiments the plurality of optical chains in the camera to use the same exposure times for image capture during normal mode of operation. Operation proceeds from step 1012 to step 1044 via connecting node A 1013.

If in step 1007 it is determined that the motion capture mode of camera operation is selected the operation proceeds from step 1007 to step 1008. In step 1008 the camera is operated in a motion image capture mode of operation, e.g., with the processor 110/211 setting the mode of camera operation to motion image capture mode. Operation proceeds from step 1008 to step 1014. In step 1014 it is determined if the user has indicated one or more portion(s) of the scene area with motion. In some embodiments the user is able to select one or more portions of the scene area with motion on the display screen that displays the preview image of the scene area to indicate which areas have motion content. The user may tap an area on the display screen, draw a circle with his/her finger on the display screen and/or take another such action in order to indicate portions of the scene area with motion. In some embodiments the camera presents a preview image in a format such as shown in FIG. 9 with different rectangles/boxes indicating different partitioned portions of the scene area and the user is allowed to select one or more displayed rectangular areas, e.g., by tapping on the screen portion displaying the rectangles to indicate the areas with motion. If in step 1014 it is determined that the user has not indicated portions of the scene area with motion the operation proceeds from step 1014 to step 1016 otherwise the operation proceeds to step 1018. In step 1016, in absence of a user indication of scene area portions with motion, a default scene area, e.g., center portion of the scene area, is selected as the scene area portion corresponding to motion. In some other embodiments in step 1016 the camera performs motion detection, e.g., on preview image areas, to detect motion in the scene area and designates scene area portion(s) with detected motion as scene area portion(s) corresponding to motion. Operation proceeds from step 1016 to step 1026 via connecting node B 1025. On the other hand in step 1018, following the determination in step 1014 that the user has indicated scene portions areas with motion, the user indicated scene portions are designated as corresponding to motion. Operation proceeds from step 1018 to step 1026 via connecting node B 1025.

Referring back now to step 1009. In step 1009, following the determination in step 1006 that input indicating a user selected module of camera operation has not been received, the camera performs motion detection, e.g., on preview image or images, to detect motion in the scene area. Operation proceeds from step 1009 to step 1020 where it is determined whether motion is detected in the scene area. If in step 1020 it is determined that no motion is detected in the scene area the operation proceeds from step 1020 to step 1010 where the camera is operated in normal mode of operation and processing discussed above with regard to steps 1010 and 1012 is performed.

If in step 1020 it is determined that motion has been detected in the scene area the operation proceeds from step 1020 to step 1022. In step 1022 the camera is operated in a motion image capture mode of operation, e.g., with the processor 110/211 setting the mode of camera operation to motion image capture mode. Operation proceeds from step 1022 to step 1024 wherein scene area portion(s) with detected motion are designated as the scene area portion(s) corresponding to motion. Operation proceeds from step 1024 to step 1026 via connecting node B 1025.

Referring now to step 1026. In step 1026 the optical chain(s), having the second focal length, corresponding to scene area portion(s) with motion are identified. Operation proceeds from step 1026 to step 1028. In step 1028 a first exposure time (e.g., E1) to be used to capture image(s) (e.g., a first image) of the scene area using a first optical chain of the first set of optical chains having the first focal length (f1) is determined. Operation proceeds from step 1028 to step 1030. In step 1030 a second exposure time (e.g., E2) to be used to capture image(s) (e.g., a second image) corresponding to portions of the scene area with motion, e.g., scene area portion(s) designated as corresponding to motion, using a second optical chain of the second set of optical chains having the second focal length (f2) is determined. In some embodiments the second exposure time is shorter than the first exposure time, e.g., E1>E2. In some embodiments step 1030 includes steps 1032 and 1034 which are performed as part of step 1030. In step 1032 an amount of motion is estimated, e.g., in the scene area and/or the designated scene area portions. In step 1034 the camera, e.g. processor 110/211, selects the second exposure time based on the estimated motion. In some embodiments greater the amount of motion the smaller the amount of selected second exposure time for the second camera module.

Operation proceeds from step 1030 to steps 1036, 1038 which may and in some embodiments are performed in parallel. In some embodiments the operation also proceeds from step 1030 to optional steps 1040 and 1041. In step 1036 the first optical chain, e.g., first camera module, is controlled to capture a first image of the scene area using the first exposure time (E1). Operation proceeds from step 1036 to step 1044 via connecting node C 1043. In step 1038 the second optical chain, e.g., second camera module, is controlled to capture a second image, e.g., of the designated scene area portion corresponding to motion, using the second exposure time (E2), with the second exposure time being less than the first exposure time. In some embodiments time in which the second image is captured overlaps a time during which the first image is captured. In some embodiments the first and second images are captured during the motion mode of camera operation. Operation proceeds from step 1038 to step 1042. In some embodiments steps 1040 and 1041 are further performed in addition to steps 1036 and 1038. In step 1040 one or more additional optical chains of the camera corresponding to scene areas with motion are used to capture additional images using the second exposure time (E2) or a shorter exposure time, e.g., a third exposure time E3.

In some embodiments the exposure time used by a module corresponding to an area of motion is determined based on the amount of motion in the scene area captured by the module for which the exposure time is being determined. The level of blurriness in the scene area being captured is sometimes used as an indication of the amount of motion with the exposure time being reduced for camera modules corresponding to high motion as compared to camera modules with lower motion. Accordingly, in some embodiments where a module corresponds to scene portion determined to have a high rate of motion, as may have been determined based on user input and/or examination of a preview image, an exposure time of E3 which is less than E2 is used while another module having the same focal length and corresponding to a lower motion area uses E2. In such an embodiment another module of the same focal length as the modules using E2 and E3 but corresponding to a scene area without motion, uses exposure time E1 which is the same as an exposure time used by a camera module having a shorter focal length, e.g., the shortest focal length used to capture an image.

Operation proceeds from steps 1040 to step 1042. In step 1041 one or more additional optical chains of the camera, corresponding to scene area portions which include no motion or little motion, are used to capture additional images using the first exposure time (E1) or a longer exposure time. For example in some embodiments a third optical chain is operated to capture a third image of a third scene area (e.g., a portion of the scene area) using the first exposure time, the third scene area corresponding to a scene area portion with no motion or little motion. Operation proceeds from steps 1041 to step 1044 via connecting node C 1043.

Referring now to step 1042. In step 1042 pixel values of images, e.g., the second image and optionally additional images capture by camera modules using second or shorter exposure time, are adjusted to compensate for use of the shorter exposure time or times. In this way step 1042 involves a normalization process which takes into consideration the effect of different exposure times to adjust pixel values so that have values which would be expected if the same exposure time was used by the multiple modules whose images are being combined.

It should be appreciated that in some embodiments using the same exposure time for multiple modules corresponding to non-motion and/or low motion areas, even though they correspond to different focal lengths and/or scene areas, facilities image combining and reduces the amount of normalization that to be implemented as part of the composite image generation process. While the same exposure time E1 is used for multiple camera modules, e.g., optical chains, in some embodiments, this is not a requirement in all cases and normalization may be used in the case where different exposure times are used. However, the general policy of reducing exposure time for modules having longer focal lengths and corresponding to areas of motion remains relevant to such embodiments. While the pixel value normalization process of step 1042, based on exposure time, is shown as a separate step, the normalization of pixel values captured by different camera modules maybe reflected in the weighting coefficients applied during the pixel value combining process used to generate a composite image. Thus the weight applied to a pixel value can include a normalization coefficient which is applied individually or as part of weight applied during the combining process. In such embodiments the weight applied to a pixel value can depend on both the exposure time used in capturing the pixel value and/or the presence of motion in the scene area to which a pixel value corresponds.

Operation proceeds from steps 1042 to step 1044 via connecting node C 1043. In step 1044 a composite image is generated from multiple captured images (e.g., images captured in steps 1036, 1038 and optionally in steps 1040 and 1042). In some embodiments the step 1044 of generating composite image includes generating the composite image from the first and second images. In some embodiments the composite image is generated using, in additional to the first and second images, additional images, e.g., third image and one or more additional images. In some embodiments step 1044 further includes performing one or more of steps 1045, 1046, 1047, 1048 and 1050 as part of generating composite image. In step 1045 an amount of motion in the scene area is estimated based on analysis of at least one of the first and second images. In some embodiments estimating the amount of motion includes step 1045' where a level of blurriness in the first image, e.g., the image corresponding to the entire scene area captured using the first (larger) exposure time E1, is determined. Consider for example that motion may cause blurriness in the captured image. The location of such blurriness can be identified with the level of blurriness being indicative, in at least some embodiments of the amount of motion. For example a higher level of blurriness normally indicates more motion than a lower level of blurriness. In some embodiments a level of blurriness in one or more portions of the first image is used as an indication of the amount of motion in the scene area portions corresponding to motion. While the image with the longer exposure time is likely to suffer more blurriness in areas of motion the other images could also be examined to identify motion but may less affected if their exposure times are shorter.

In some embodiments the step 1045 of estimating the amount of motion includes comparing a portion of the first and second images to determine an estimate of how much the first and second images differ from one another in the area being compared. This may be done as an alternative or in combination with considering blurriness within an image.

It should be appreciated that by analyzing and comparing the first and second images, e.g., including comparing the areas of blurriness in the first image with corresponding area in the second image which corresponds to scene area portion with motion, an estimation of an amount of motion in the scene can be made.

Knowledge of where motion occurs in a scene and the amount of motion at a given scene area can, and in some embodiments is used when determining how to combine pixels captured by different camera modules. For example, pixel values corresponding to a scene area of motion obtained from an image with a shorter exposure time may be weighted more heavily than pixel values corresponding to the same scene area obtained from an image captured by a camera module having a longer exposure time. Pixel values corresponding to motion scene areas or scene areas of a large amount of motion, captured by a camera module having a short exposure time contribute heavily to the scene areas in the composite image where motion occurred while pixel values corresponding to such scene areas with motion, captured by camera modules having longer exposure times, and thus subject to more blurriness, will contribute less to such areas in some but not necessarily all embodiments.

Pixel values corresponding to non-motion scene areas or scene areas of little motion, captured by a camera module having a long exposure time contribute heavily to the corresponding scene areas in the composite image while pixel values corresponding to such scene areas with little or no motion, captured by camera modules having shorter exposure times will contribute less to such areas in the composite image in some embodiments.

Thus, by weighting pixel values based on the exposure time and determined locations of motion in the scene area being captured, pixel values from first and second images can be combined in a novel manner to eliminate or minimize the blurriness in a composite image which might occur due to motion during an image capture time period.

As discussed further below in some embodiments the information regarding estimated motion is used in accordance with the features of the invention to combine pixels from different captured images as part of generating the composite image.

In some embodiments the method includes step 1046 wherein pixel values within captured images corresponding to scene areas of motion are identified, e.g., based on the blurriness of one or more images and/or differences between image portions corresponding to the same scene area captured by camera modules with different exposure times. Thus, while a scene portion may have been designated as corresponding to motion and the exposure time of a camera module capturing the scene area reduced as compared to other camera modules of the same focal length where motion did not occur, when combining pixel values the consideration whether an individual pixel or group of pixels corresponds to motion is taken into consideration in some embodiments. This takes into consideration that motion may not occur in all areas of a scene portion captured by a camera module in which case it may be desirable to weight pixel values which were captured using an exposure time, e.g., a long exposure time, determined without taking motion into consideration, more heavily than pixel values which were captured with a shorter exposure time because of the motion.

In step 1047 pixel values from different images are combined to generate a composite image. In some embodiments the combining of pixel values from different images to generate a pixel value in the composite image is based on the estimated amount of motion in the scene area to which the pixel in the composite and captured images correspond. The combining process can be and sometimes is performed on a per pixel basis with pixels from multiple captured images being weighted and combined to form a pixel of the composite image.

In some embodiments weighting of a pixel value from a captured image is a function of the amount of motion in the scene area portion to which pixel values being combined correspond. In some embodiments step 1047 includes steps 1048 and 1050. In step 1048 the processor 110/211 performs a weighted combination of pixel values from the first and second images with the pixel values which are combined corresponding to the same scene area, e.g., a portion of scene area portion 904 (with motion) and the overlapping portion of the entire scene area 802.

The pixel combining process may be implemented using alpha blending or another technique. In some embodiments each pixel which is being combined to generate a pixel of a composite image is multiplied by a coefficient, e.g., a weight, and the resulting values are summed to generate a composite pixel value.

For example a composite pixel value may be generated using the equation:

$$CPV_1 = APV1C_1 + BPV1C_2 + \ldots + ZPV1C_N$$

where $CPV_1$ is a first composite pixel value of the generated composite image and which corresponds to a first area of a scene;

$PV_1C_1$ is a first pixel value captured by a first camera module $C_1$;

$PV_1C_2$ is a first pixel value captured by a second camera module $C_2$;

$PV_1C_N$ is a first pixel value captured by the Nth camera module $C_N$; and where all of the first pixel values correspond to the same scene area/area portion. Dots " . . . " are used in the above equation to show that pixel values of other camera modules may be combined and contribute to the composite pixel value $CPV_1$ of the composite image in the same or similar manner the other pixel values are combined.

A, B and Z are weights used in the combining process. The larger the weight the greater the contribution of the pixel value to which the weight is applied to the final composite pixel value being generated. If the weight is set to 0 the pixel value which is multiplied by the zero weight will not contribute to the composite pixel value. As discussed above, the weights used in combining pixel values corresponding to different images may take into consideration whether there is motion at the scene area location to which the pixel value corresponds and the exposure time. In some embodiments in the case of pixel values corresponding areas of motion, pixel values corresponding to cameras using shorter exposure times are weighted more heavily than pixel values with longer exposure times. Thus, the weight used in the pixel combining process is a function of both detected motion and camera module exposure time in some embodiments. For a short exposure time the weight used in the pixel value combining process increases as the amount of detected motion corresponding to the pixel increases. For a longer exposure time the weight used in the pixel value combining process is decreased as the amount of motion corresponding to a pixel decreases.

In step 1050, as part of the composite image generation operation, in at least one embodiment a combined pixel value is generated from a weighted sum of pixel values corresponding to images of the scene area captured by different optical chains, pixel values from images corresponding to optical chains using the second or a shorter exposure time being weighted more heavily when they correspond to scene area portions with motion than pixel values corresponding to an image captured by an optical chain using the first or a longer exposure time. In some embodiments the weighted combination of pixel values weights a pixel value in the second image more heavily than a pixel value in the first image when the pixels of the first and second images which are being combined correspond to an area of motion. The heavier the weight of a pixel value the greater the contribution the pixel value has to a combined pixel value generated by said weighted combination of pixel values.

In some embodiments in the weighted combination of pixel values, a pixel value in the first image captured using a long exposure time is weighted more heavily than a pixel value in the second image, captured using a shorter exposure time, corresponding to the same scene area when the pixels of the first and second images which are being combined correspond to an area where there is no or little motion.

Operation proceeds from step 1044 to step 1052. In step 1052 the generated composite image is stored, e.g., in the camera memory 108/213. Operation proceeds from step 1052 to step 1054. In step 1054 the generated composite image is output, printed, transmitted to another device and/or displayed, e.g., on a display device. Operation proceeds from step 1052 back to step 1004 via connecting node D 1056.

Figure 11:
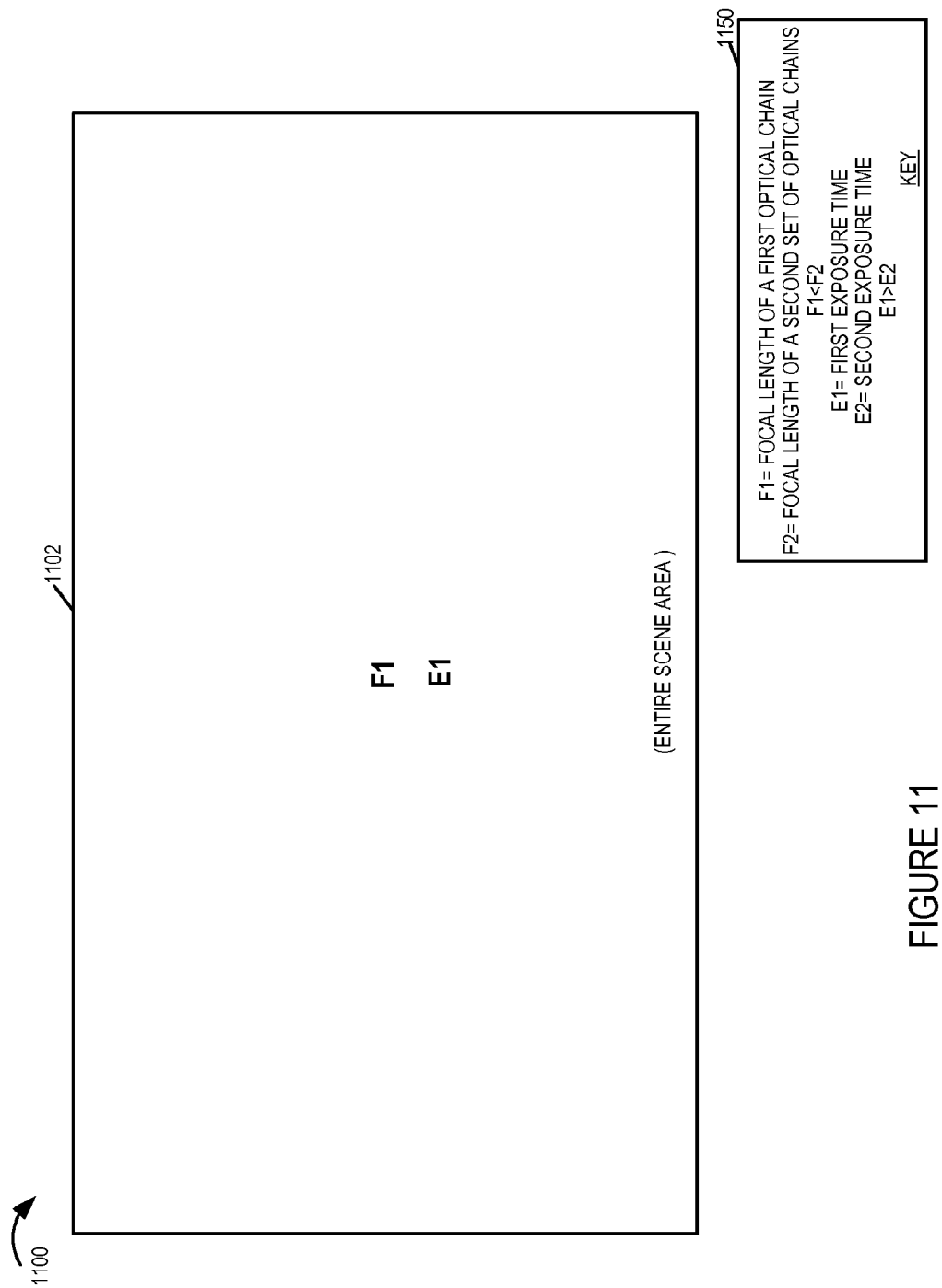
FIG. 11 illustrates a scene area captured by an exemplary first optical chain, e.g., camera module, having a first focal length f1, during a normal or non-motion mode of camera operation.

FIG. 11 is a drawing 1100 illustrating a scene area 1102 captured by a first optical chain, e.g., camera module, having a first focal length f1, during a normal mode of camera operation (also referred to as normal image capture mode). In some embodiments a camera device, e.g., such as camera 100/200/600, is operated in a normal mode of operation when a scene area of interest being captured has no motion or little motion, e.g., when one or more objects within the scene of interest remain static or change position/move minimally. The first camera module may be one of the camera modules 1226, 1228, 1230, 1232 and 1234 having focal length f1 shown in FIG. 7. As discussed earlier the f1 camera modules have the largest field of view and thus capture larger scene areas relative to other smaller focal length camera modules. The relationship between the scene areas captured by different camera modules corresponding to the f1 and f2 focal lengths can be appreciated in the context of FIGS. 11 through 14 which show the scene areas captured by different optical chains with the focal lengths of the optical chains and exposure times used to capture images corresponding to the shown areas being also indicated. Assume for discussion purposes that (f1) camera module 1228 is used to capture the scene area 1102 represented by the rectangle in FIG. 11. The rectangle representing the scene area 1102 captured by a smaller focal length (f1) camera modules may be considered to indicate the field of view (fov) of the camera module 1228.

Drawing 1100 shows the entire scene area 1102 that corresponds to the full scene area of interest captured by the first camera module, e.g., camera module 1228, having focal length f1 in the normal mode of camera operation). In accordance with one aspect in the normal mode of camera operation the camera module 1228 capturing scene area 1102 uses the first exposure time E1. Box 1150 represents a key that facilitates an understanding of notations used in FIGS. 11 through 14 and elsewhere. Key 1150 indicates that F1 (or f1)=Focal length of a first set of optical chains (including the first optical chain, e.g., camera module 1228), and F2 (or f2)=Focal length of a second set of optical chains, with F2 being greater than F1 (F1<F2). Key 1150 further indicates that E1=a first exposure time and E2=a second exposure time, which may used by various optical chains to capture images in the normal mode and motion mode of camera operation, with E1 being greater than E2 (E1>E2).

Figure 12:
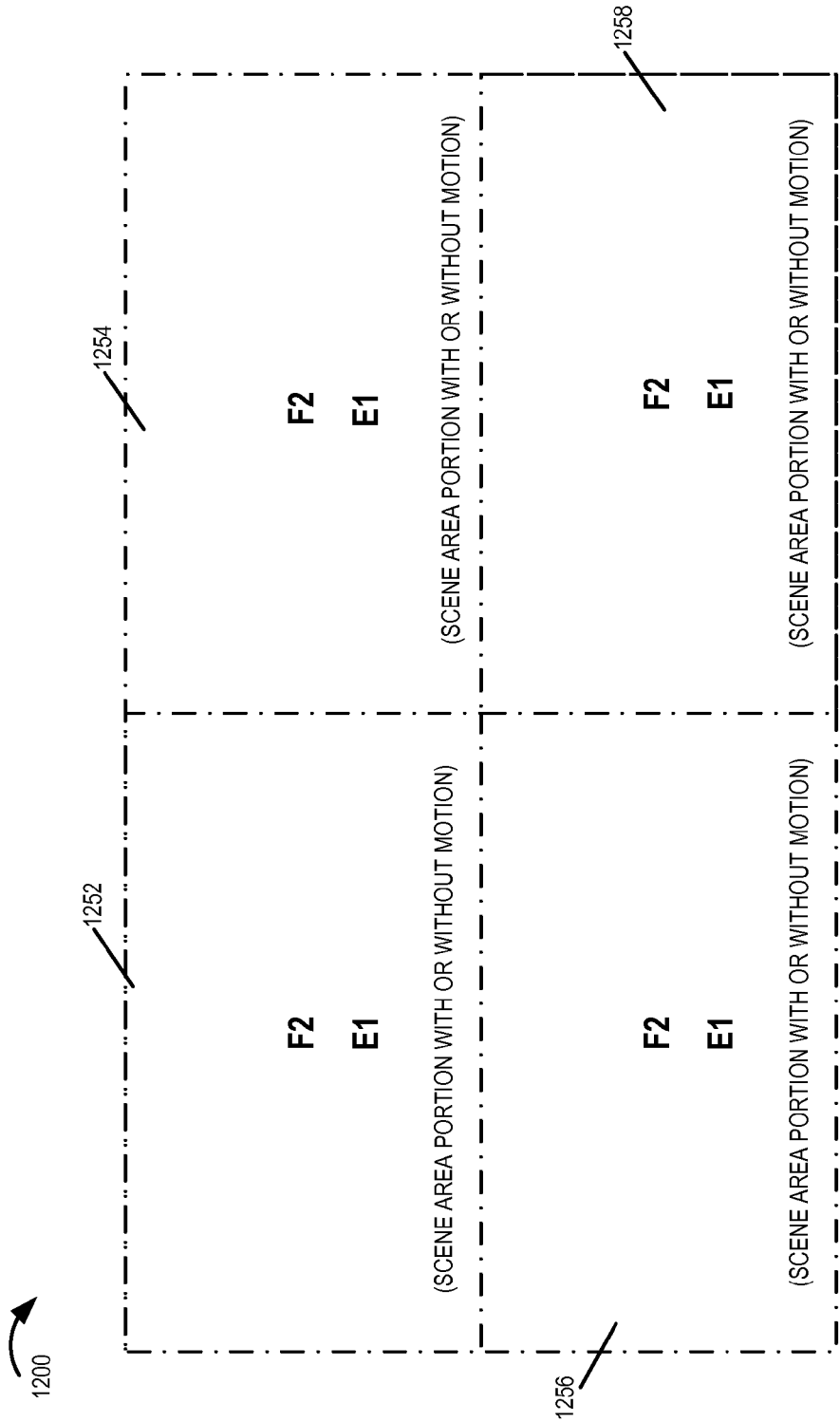
FIG. 12 illustrates different scene area portions captured by different optical chains, e.g., camera modules, having a second focal length f2 in the normal mode of camera operation.

FIG. 12 is a drawing 1200 illustrating portions 1252, 1254, 1256 and 1258 of the full scene area 1102, captured by different optical chains, e.g., camera modules, having a second focal length f2 in the normal mode of camera operation. For discussion purposes consider that scene area 1102 includes the same or similar objects as shown in FIGS. 8 and 9 with at least one scene area portion, e.g., scene area portion 1254 including motion. The f2 camera modules capturing scene area portions 1252, 1254, 1256 and 1258 may be the optical chains 1204, 1208, 1218 and 1214 respectively having focal length f2 shown in FIG. 7. As discussed earlier the f2 camera modules have the medium field of view and capture scene areas which are smaller than the full scene area 1102. For purposes of discussion consider that (f2) camera module 1204 is used to capture the scene area 1252, (f2) camera module 1208 is used to capture the scene area 1254, (f2) camera module 1218 is used to capture the scene area 1256 and (f2) camera module 1214 is used to capture the scene area 1258. The rectangles representing the scene area portions 1252, 1254, 1256 and 1258 captured by the larger focal length (f2) camera modules may be considered to indicate the field of view (fov) of the camera modules 1204, 1208, 1218 and 1214.

In accordance with one aspect in the normal mode of camera operation the camera modules 1204, 1208, 1218 and 1214 capturing scene area portions 1252, 1254, 1256 and 1258 use the same exposure time, e.g., E1, that is used by the (f1) camera module 1228 for capturing an image of scene area 1102, irrespective of whether there is motion or no motion in the scene area portions. Thus in at least some embodiments in the normal image capture mode different camera modules with different focal lengths use the same exposure time, e.g., exposure time E1, for capturing images of corresponding scene areas.

Figure 13:
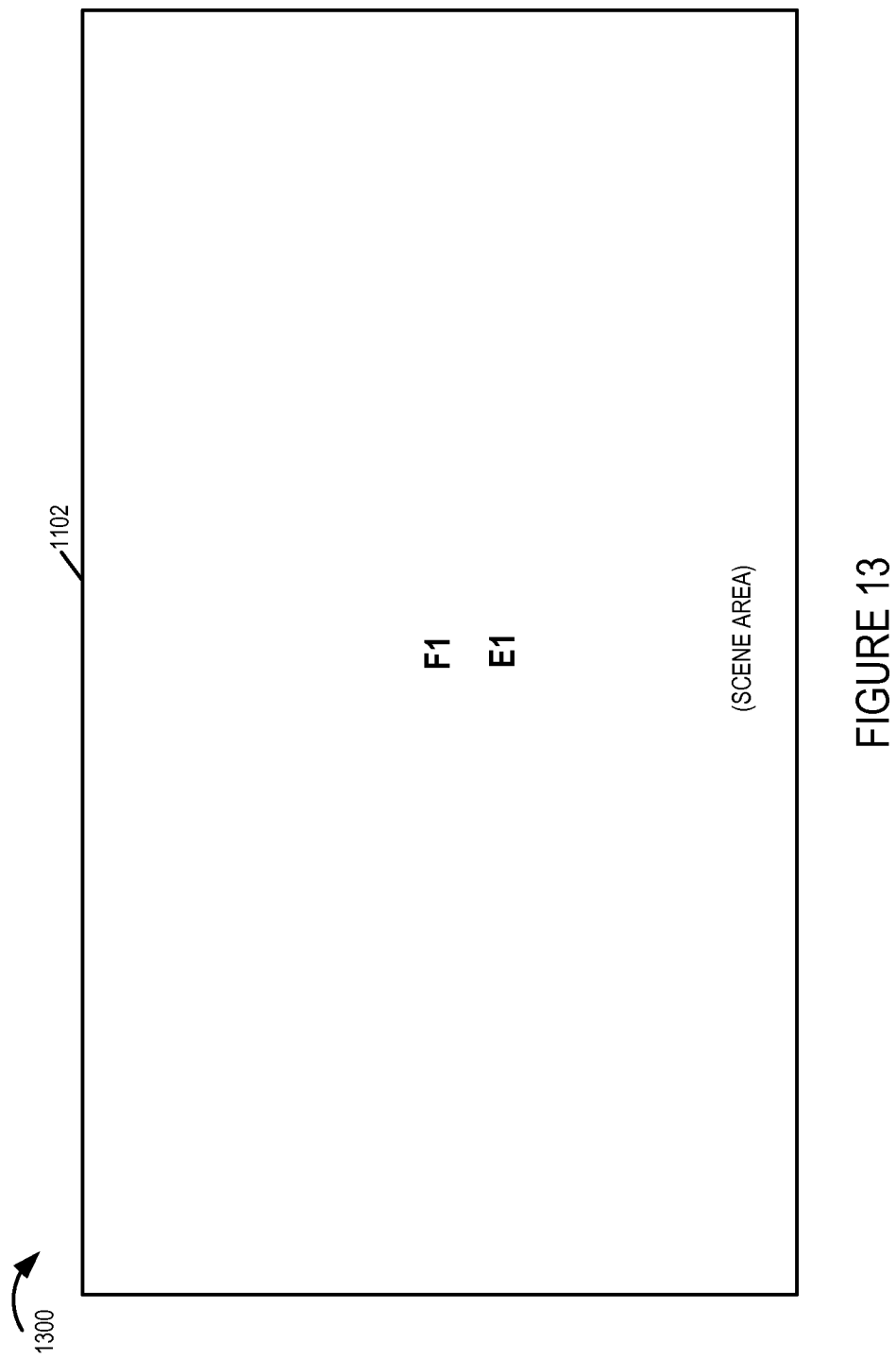
FIG. 13 illustrates the scene area captured by the first optical chain having a first focal length f1, during a motion mode of camera operation.

FIG. 13 is a drawing 1300 illustrating the scene area 1102 captured by the first optical chain, e.g., camera module, having a first focal length f1, during a motion mode of camera operation (also referred to as motion image capture mode). In some embodiments a camera device, e.g., such as camera 100/200/600, is operated in a motion mode of operation when at least some portions of a scene area of interest being captured include motion, e.g., when one or more objects within the scene of interest are in motion or change position/move at a relatively faster rate. As discussed with regard to FIG. 11 the first camera module may be one of the camera modules 1226, 1228, 1230, 1232 and 1234 having focal length f1 shown in FIG. 7. The same reference number 1102 has been used to identify the rectangle representing the scene area captured by the camera module 1228 in the motion mode of operation since irrespective of the mode the capture area remains the same. Furthermore in accordance with the features of the present invention, in at least some embodiments the exposure time used for image capture in the motion capture mode by the (f1) camera modules such as camera module 1228 to capture the entire scene area remains the same the exposure time used by (f1) camera module 1228 in the normal mode, e.g., E1.

Figure 14:
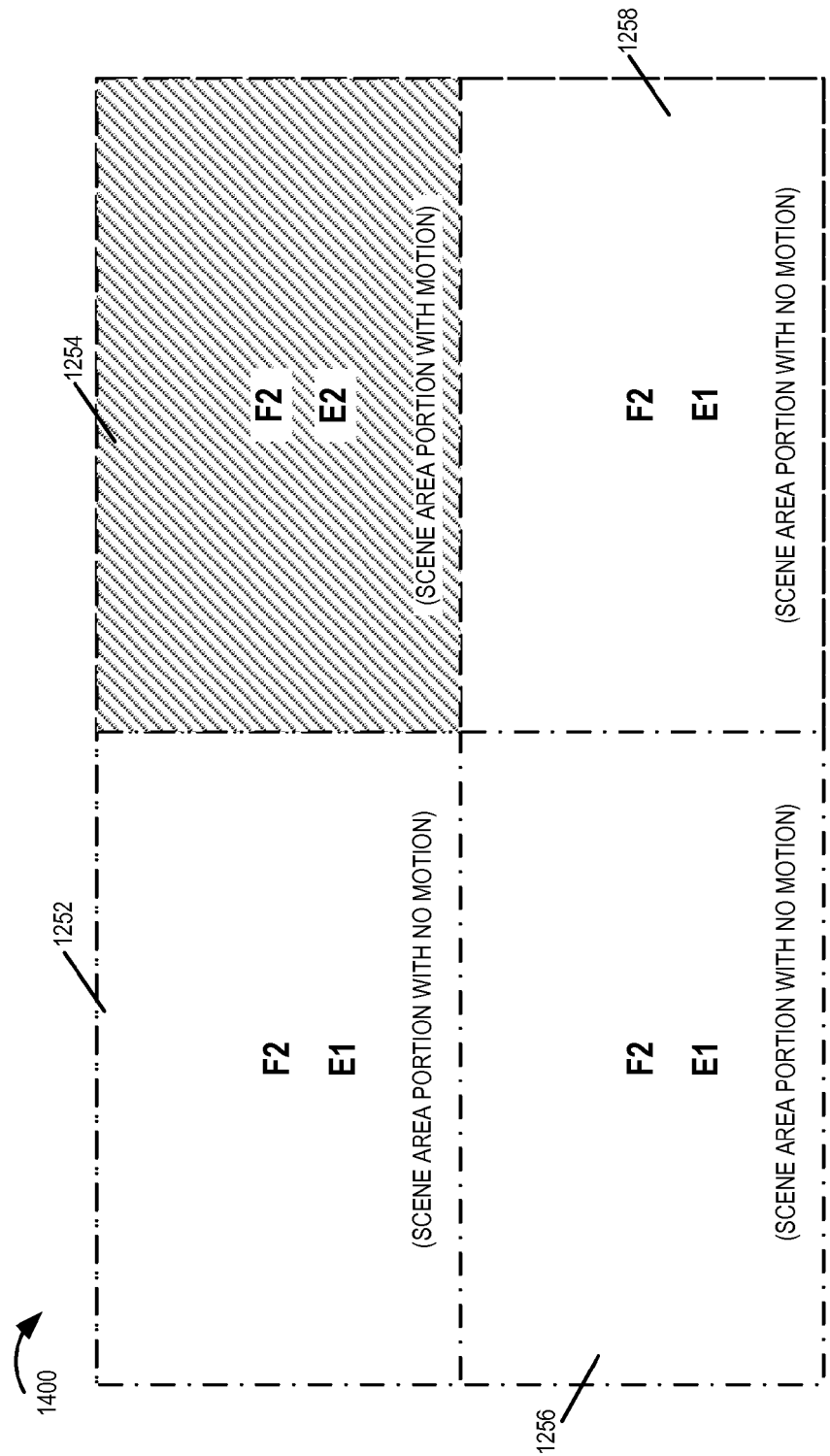
FIG. 14 illustrates scene area portions of the full scene area, captured by different optical chains having a second focal length f2 in the motion mode of camera operation.

FIG. 14 is a drawing 1400 illustrating portions 1252, 1254, 1256 and 1258 of the full scene area 1102, captured by different optical chains, e.g., camera modules, having a second focal length f2 in the motion mode of camera operation. The f2 camera modules capturing scene area portions 1252, 1254, 1256 and 1258 may be the optical chains 1204, 1208, 1218 and 1214 respectively having focal length f2 shown in FIG. 7. The same reference numbers 1252, 1254, 1256 and 1258 have been used to identify the rectangles representing the scene area portions captured by the camera modules 1204, 1208, 1218 and 1214 in the motion mode of operation since irrespective of the mode of camera operation the capture area remains the same. In the illustrated example a diagonal lining pattern is used to indicate the scene area portion 1254 including motion. As indicated in drawing 1400, in accordance with the features of the present invention, in at least some embodiments the exposure time "E2" used in the motion capture mode by a camera module (e.g., module 1208) which corresponds to the scene area portion having motion to capture the scene area portion 1254 is different and shorter than the exposure times "E1" used by the camera modules 1204, 1218 and 1214 to capture their corresponding scene area portions 1252, 1256 and 1258 respectively which have no or minimal motion. The camera module 1208 which corresponds to the scene area portion having motion uses the second exposure time E2 (with E2<E1) to capture the scene area portion 1254.

Thus in at least some embodiments in the motion image capture mode different camera modules use different exposure times depending on which camera module is being used to capture scene portion with motion. In accordance with one aspect of the invention the selection of a shorter exposure time for camera modules capturing scene portions with motion has various advantages. For example, the shorter exposure time avoids the blur produced due to the relatively high speed of the action. In some embodiments the field of view (fov) of the larger focal length (f2) camera module corresponding to the scene portion with motion is moved to ensure that it covers the subject.

In some embodiments a composite image is then composed by the combination of the images corresponding to the entire scene area 1102 captured in the motion mode and images corresponding to one or more area portions with motion, e.g., scene area portion 1254. The combination ensures that the "good" parts of both the captured images are preserved. Hence, the composed image has well-exposed background, e.g., due to the use of the image of the entire scene area 1102, along with the non-blurry subject performing his action, e.g., due to the use of image of the scene area portion 1254 with motion captured using a shorter exposure time. In some embodiments, weighted average of the images is performed for generating the composite image. The weighting may be and in some embodiments is, a function of motion in a scene area. The combining process may take into consideration the exposure time, e.g., pixel values may be normalized or otherwise adjusted to take into consideration the different exposure times which produce pixel values being combined.

An exemplary camera device, e.g., such as camera 100 or 200, implemented in accordance with the invention, comprises: a plurality of optical chains including a first optical chain and a second optical chain; and a processor (e.g., processor 110/211) configured to detect user input. In some embodiments the user input may be received via a touch sensitive display, e.g., a display 102/215, and/or via one or more control buttons on the camera. In various embodiments the processor is configured to: control the first optical chain to capture a first image of a first scene area using a first exposure time; and control the second optical chain to capture a second image of a second scene area using a second exposure time which is shorter than said first exposure time, a time in which said second image is captured overlapping a time during which said first image is captured. In some embodiments the second optical chain has a larger focal length than said first optical chain; and second scene area overlaps a portion of said first scene area.

In some embodiments the first and second images are captured during a motion mode of camera operation. In some embodiments the processor 110/211 is further configured to generate a composite image from said first and second images, said processor being configured to perform a weighted combination of pixel values from said first and second images for a portion of said first scene area which is overlapped by said second scene area, as part of being configured to generate the composite image.

In some embodiments the processor 110/211 is further configured, as part of performing the weighted combination of pixel values, to weight a pixel value in said second image more heavily than a pixel value in said first image when the pixels of said first and second images which are being combined correspond to an area of motion, the heavier the weight of a pixel value the greater the contribution the pixel value has to a combined pixel value generated by said weighted combination of pixel values.

In some embodiments the processor 110/211 is further configured, as part of performing the weighted combination of pixel values, to weight a pixel value in said first image more heavily than a pixel value in said second image when the pixels of said first and second images which are being combined correspond to an area where there is no motion. In some embodiments the weighting is a function of an amount of motion in the area to which pixel values being combined correspond.

In some embodiments the processor 110/211 is further configured to estimate an amount of motion based on analysis of at least one of said first and second images. In some embodiments the processor 110/211 is further configured, as part of being configured to estimate the amount of motion, to determine a level of blurriness in said first image.

In some embodiments the processor 110/211 is further configured, as part of being configured to estimate the amount of motion, to compare a portion of said first and second images to determine an estimate of how much said first and second images differ from one another in the area being compared.

In some embodiments the camera device further includes a third optical chain. In some such embodiments the processor 110/211 is further configured to control said third optical chain to capture a third image of a third scene area using said first exposure time, said third scene area corresponding to a scene area with no motion or little motion.

In some embodiments the processor 110/211 is further configured, as part of being configured to generate a composite image, to use said third image to generate said composite image, said second and third images corresponding to different portions of a scene area to which the first image corresponds. In some embodiments the second and third optical chains have longer focal lengths than said first optical chain. In some embodiments the first optical chain captures a larger scene area than said second and third optical chains. In some embodiments the first and second images with different exposure times are captured during a motion mode of operation.

In some embodiments the processor 110/211 is further configured to: decide whether to operate said camera in a motion capture mode of operation or a non-motion mode of operation; control at least some different optical chains in said camera to use different exposure times during said motion capture mode of operation; and control optical chains in said camera to use the same exposure times during said non-motion mode of operation.

In some embodiments the processor 110/211 is further configured to detect a user input indicating the mode of camera operation to be used. In some embodiments the processor 110/211 is configured to decide whether to operate said camera in a motion mode of operation or a non-motion mode of operation based on the user input indicating the mode of camera operation to be used.

In some embodiments the processor 110/211 is further configured to: perform a motion detection operation on one or more captured images. In some embodiments the processor 110/211 is further configured to decide whether to operate said camera device in a motion capture mode of operation or a non-motion mode of operation based on results of said motion detection operation.

An exemplary camera device, e.g., camera 100/200, in some embodiments includes a non-transitory computer readable medium, e.g., memory 108/213, including computer executable instructions which when executed by a processor (e.g., processor 110/211) control the camera device to: control a first optical chain of the camera device to capture a first image of a first scene area using a first exposure time, and control a second optical chain of the camera device to capture a second image of a second scene area using a second exposure time which is shorter than said first exposure time, a time in which said second image is captured overlapping a time during which said first image is captured.

In some embodiments the camera device 100/200 includes module for implementing the functions corresponding to each of the steps of flowchart 1000 discussed above. In some embodiments such modules are implemented as software modules, e.g., in the memory 108/213. In other embodiments the modules are implemented in hardware, e.g., as individual circuits with each module being implemented as a circuit for performing the function to which the module corresponds. In still other embodiments the modules are implemented using a combination of software and hardware.

The modules can, and in some embodiments are, implemented fully in hardware within the processor 110/211, e.g., as individual circuits. The modules can, and in some embodiments are, implemented fully in hardware, e.g., as individual circuits corresponding to the different modules. In other embodiments some of the modules are implemented, e.g., as circuits, within the processor 110/211 with other modules being implemented, e.g., as circuits, external to and coupled to the processor 110/211. As should be appreciated the level of integration of modules on the processor and/or with some modules being external to the processor may be one of design choice. Alternatively, rather than being implemented as circuits, all or some of the modules may be implemented in software and stored in the memory 108/213 of the camera device, with the modules controlling operation of the camera device 100/200 to implement the functions corresponding to the modules when the modules are executed by a processor, e.g., processor 110/211. In still other embodiments, various modules are implemented as a combination of hardware and software, e.g., with another circuit external to the processor providing input to the processor 110/211 which then under software control operates to perform a portion of a module's function.

While shown in the FIG. 1 and FIG. 4A embodiments as a single processor, e.g., computer, it should be appreciated that the processor 110/211 may be implemented as one or more processors, e.g., computers. When implemented in software the modules include code, which when executed by the processor 110/211, configure the processor 110/211 to implement the function corresponding to the module. In embodiments where such modules are stored in the memory 108/213, the memory 108/213 is a computer program product comprising a computer readable medium comprising code, e.g., individual code for each module, for causing at least one computer, e.g., processor 110/211, to implement the functions to which the modules correspond.

Figure 17:
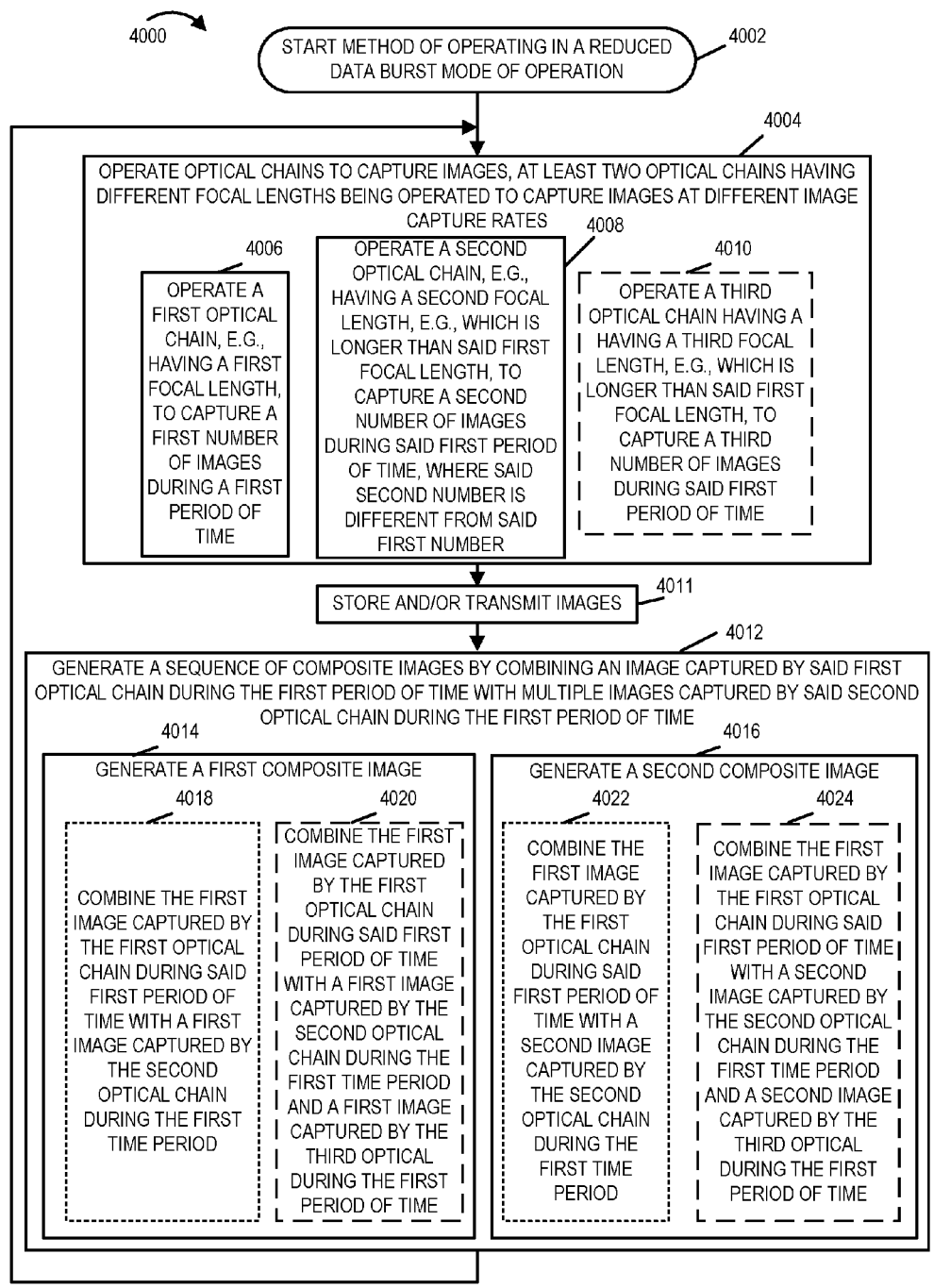
FIG. 17 is a flowchart of an exemplary method of operating a camera device, including a plurality of optical chains including a first optical chain and at least a second optical chain, in a reduced data burst mode of operation.

As should be appreciated, the processor 110/211 is configured to control the camera device 100/200 or one or more other elements therein to perform the functions of corresponding steps illustrated and/or described with regard to the flowchart 1000, and/or the other flow charts included in the application such as flowchart 4000 which shows the steps of a reduced data burst mode of operation. The steps are performed as part of the exemplary method of operating the camera device. FIG. 17 is a flowchart 4000 of an exemplary method of operating a camera device, including a plurality of optical chains including a first optical chain and at least a second optical chain, in a reduced data burst mode. In some embodiments, the camera device further includes a third optical chain. The first, second and third optical chains, e.g., camera modules have, first, second and third focal lengths which in some embodiments are different. While the reduced data burst mode is explained in the context of an example of one camera module of each focal length it should be appreciated that in some embodiments a set of camera modules corresponding to each focal length are used. For example, in one particular embodiment in which the camera device of the FIG. 7 example is used, 4 short focal length camera modules are available and maybe used, four second size focal length camera modules are available and are used and four third focal length camera modules are used. In such embodiments the number of images captured during each capture interval would be four times that shown in FIG. 14. As the number of modules in each set of different focal lengths increases, it should be appreciated that a reduced data approach such as shown in FIG. 16 becomes even more beneficial. While multiple modules of a given focal length maybe used, the number of composite images generated will normally match the desired output rate. Thus, even if more modules maybe used to capture images, the number of composite images for a time interval may not increase.

In various embodiments, the camera device implementing the method of flowchart 4000 supports both a normal mode of operation, e.g, a normal burst mode of operation such as shown in FIG. 15, and a reduced data burst mode of operation such as shown in FIG. 16. However, the reduced data burst mode maybe used and supported without supporting or implementing a normal burst mode in the same camera device.

The normal data burst mode will now be explained with reference to FIG. 15. FIG. 15 shows the method 1500 of capturing images and generating a set 1520, e.g., stream, of composite output images during a number of consecutive time intervals 1504 where each interval T1 through TN is a time period in which multiple images maybe captured in sequence as part of normal data burst mode operation. Legend 1521 explains the annotations and labeling used in the FIG. 15 example. In the FIG. 15 example in column 1502 the camera modules which are used to capture images are shown. The camera modules include a first camera module C1 having a focal length F1 which is the shortest focal length used in the exemplary embodiment. Camera module 1228 may be used as camera module C1F1. Note that the camera device shown in FIG. 7 includes additional camera modules 1226, 1234, 1232 and 1230 having focal length F1 which may, and sometimes are, also used to capture images at a low rate, e.g., a first rate. As can be seen in FIG. 15, each of the camera modules capture images at the same rate, e.g., once per capture time period. In FIG. 15, multiple image capture time periods, e.g., 4 image capture time periods are included in each time interval. The second focal length camera C2F2 and third focal length camera C2F3 each capture images at the same rate as the shortest focal length camera module or models in the FIG. 15 embodiment. The images captured by different modules in a capture time period are then combined to generate one of the composite output images of the image sequence generated. Thus, in the FIG. 15 example the camera modules are operated at the same image capture rate.

In order to support a reduced capture rate, in some embodiments camera modules with a shorter focal length, e.g., which capture a large scene area including background portions, is operated as a lower image capture rate than longer focal length camera modules which are more likely to capture motion at least in some cases. It should be appreciated that operating a large number of modules in parallel can result in a lot of memory being consumed for image storage as well as power consumption associated with operating a large number of modules in parallel.

The reduced data burst mode will now be explained with reference to FIG. 16. Consider for example 16 which shows the process 1600 of capturing images and generating a set 1620, e.g., stream, of composite output images during a number of consecutive time intervals 1604 where each interval is a time period in which multiple images maybe captured in sequence as part of reduced data burst mode operation. Legend 1621 explains the annotations and labeling used in the FIG. 16 example. In the FIG. 16 example in column 1602 the camera modules which are used to capture images are shown. The camera modules include a first camera module having a focal length F1 which is the shortest focal length used in the exemplary embodiment. Camera module 1228 may be used as camera module C1F1. Note that the camera device shown in FIG. 7 includes additional camera modules 1226, 1234, 1232 and 1230 having focal length F1 which may, and sometimes are, also used to capture images at a low rate, e.g., a first rate. As can be seen in FIG. 16, the low rate may be a rate of once for each capture interval T where T includes, in the FIG. 16, multiple image capture time periods, e.g., 4 image capture time periods. In the FIG. 16 example, TN time intervals are shown with each of the TN time intervals including 4 image capture points in time which mark the start of an image capture by one or more camera modules. Thus, each time interval T includes in the FIG. 16 example 4 image capture time periods which, in some embodiments, correspond to the desired output frame rate. For example, each of the four capture time periods may correspond to the desired output rate, e.g., $\frac{1}{30}$ or $\frac{1}{60}$th of a second in some embodiments or a shorter time period if a higher image capture rate is desired, e.g., because of action.

At the start of each image capture period within the time interval, the camera modules which are to capture an image during the capture time period are triggered to capture an image. However, in other embodiments the lowest rate image capture may occur at another point in the time interval, e.g., at a image capture time period at or adjacent the center of the time interval T1.

During the reduced data rate image capture process shown in FIG. 16, the first camera module with the shortest focal length is operated at the lowest data rate and in this example captures an image a single time during T1. However, camera module C2F2, which has the second focal length which falls between F1 and F3 in size, is operated at a faster image capture rate than the first camera module and captures 2 images during the time interval T1. The image captures by C2F2 are spaced in time to minimize the effect of motion between the limited number of capture time periods by making the spacing in time between the image captures uniform and evenly spaced. Thus, in the FIG. 16 example, the second camera module captures images during the first and third capture periods of time interval T1. Other modules with the same focal length maybe operated in the same manner if multiple modules of the same focal length are used.

Consider for example that during the first image capture time period of interval T1, the first camera module C1F1 captures image $I1_{C1F1}$, the second camera module C2F2 captures image $I1_{C2F2}$, and the third camera module C3F3 captures image $I1_{C3F3}$ During the second image capture period of time interval T1, because camera module C1F1 and C2F2, which have a shorter focal length than the third camera module C3F3, are operated at a lower image capture rate than camera module C3F3, modules C1F1 and C2F2 do not capture an image while module C3F3 captures an image $I2_{C3F3}$. Thus during time period two of time interval T1 the module or modules with the third focal length is operated to capture an image but not the modules with focal lengths F1 and F2.

During the third time period of interval T1, camera modules CEF2 and C3F3 are operated to capture images. Then in the fourth time period of interval T1 the third camera module C3F3 is operated to capture an image but the modules with shorter focal lengths do not capture images during the fourth time interval.

The third camera module C3F3, which has the longest focal length and maybe implemented, e.g., using module 1210 shown in FIG. 7. Camera module C3F3 is operated to capture images at the desired output rate in the FIG. 16 example and is thus operated to capture an image in each of the four image capture time periods in interval T1. As can be see the FIG. 7 camera device includes several other modules having focal length F3 and each of these may be, and in some embodiments are, operated to capture images at the same rate as C3F3.

Image capture during the second and subsequent time intervals t2 through TN occurs in the same manner as during T1.

Composite image generation is represented in the FIG. 16 example by the sue of arrows leading from the captured images to the composite image to which they contribute. Given the different image capture rates, images captured at the lower image capture rates contribute to multiple images while images captured at the output image rate in the FIG. 16 example correspond to a single image.

In some but not necessarily all embodiments the image capture rate used by the longer focal length camera modules is an integer multiple of the image capture rate of the shorter focal length camera modules. For example, the image capture rate of modules having the third focal length is twice the image capture rate of modules having the second focal length. In addition the image capture rate of the camera modules with the second focal length is twice that of the image capture rate of modules with the shortest focal length F1.

While multiple modules having the same focal length maybe operated in parallel, e.g., using the image capture rates shown in FIG. 16, not all camera modules having a given focal length need be used. For example, in some embodiments one or two camera modules having the F1 focal length are used as part of a reduced burst mode of operation, for camera modules having the focal length f2 are used and four or more camera modules having the focal length f3 are used. Normally, given that the shorter focal length cameras have a greater field of view and capture a larger scene area, as the focal length increases the number of camera modules used in parallel having the focal length will also increase in some reduced data embodiments.

It should be appreciated that in the FIG. 16 reduced data burst mode of operation, 7 images will be captured per time interval in the particular illustrated example. This is considerable less than the 12 images which will be captures using the same set of 3 camera modules in the normal burst mode example of FIG. 15. Depending on the number of modules used and the differences in image capture rates even greater relative savings in data can be achieved if some modules are operated at even lower image capture rates.

A method of implementing a reduced data burst mode of operation will now be described with reference to the flow chart 4000 of FIG. 17. The method shown in FIG. 17 can be used to control the device of FIGS. 1 and 7 to capture images at the rate shown in FIG. 16 and with a composite output image stream being generated, stored, transmitted and/or displayed at the rate shown in FIG. 16.

Reduced data burst mode operation starts in step 4002, e.g., with the reduced burst mode subroutine shown in FIG. 17 being loaded into the processor of the camera device and executed, e.g., in step 1090 in response to detecting that the user selected a reduced data burst mode of operation. The user may specify as part of the reduced burst mode of operation the desired composite output frame, e.g., image, rate which will be used to determine the number of composite images per second produced. The output frame rate may, and in some embodiments does, match a user indicated desired video frame rate, e.g., 1/30 or 1/60 of a second which results in an output of 30 or 60 composite images per second, respectively. Operation proceeds from step 4002 to step 4004.

In step 4004 the camera device operates optical chains to capture images, at least two optical chains having different focal lengths being operated to capture images at different image capture rates. Step 4004 includes step 4006 and 4008. In some embodiments, step 4004 further includes step 4010.

In step 4006 the camera device operates a first optical chain, e.g., an optical chain having a first focal length, to capture a first number of images during a first period of time.

In step 4008 the camera device operates a second optical chain, e.g., having a second focal length, e.g., which is longer than the first focal length, to capture a second number of images during said first period of time, where said second number is different from said first number. In step 4010 the camera device operates a third optical chain having a third focal length, e.g., which is longer than said first focal length, to capture a third number of images during said first period of time.

In various embodiments, the second number of images is larger than the first number of images. In some embodiments the second number of integers is an integer multiple, e.g., 2, 3 or 4, or a larger integer number, time first number of images. In some such embodiments, the first and second optical chains have different focal lengths and the second focal length is longer than the first focal length. In some embodiments the second focal length is two or more times the first focal length. For example F1 maybe and in some embodiments is a 35 mm film equivalent focal length and the second focal length F2 is a 70 mm film equivalent focal length.

In various embodiments, the first time period is a time period during which the camera device is operating in a reduced data burst mode of operation and includes sufficient time for multiple images to be captured sequentially, e.g., 2, 3, 4, 10, 16 or more sequential images.

In various embodiments, the first optical chain captures a larger scene area than the second optical chain. In various embodiments, the first optical chain captures a larger scene area than the third optical chain. In some embodiments, the first optical chain captures a larger scene area than the second optical chain, and the second optical chain captures a larger scene area than the third optical chain. The third optical chain in some but not all embodiments has a focal length two or more times that of the second optical chain, e.g., a 150 mm film equivalent focal length. However, in some embodiments multiple optical chains of the second focal length maybe used and the third optical chain may have the same focal length as the second optical chain. In some such embodiments, the second focal length is the same as the third focal length.

In some embodiments, the third optical chain, having a focal length longer than the first focal length, is operated in step 4010 to capture images during the first period of time at the same rate as the second optical chain. Thus it should be appreciated that it is not necessary that all optical chains with different focal lengths be operated at different rates.

In some embodiments, the third optical chain, has a third focal length which is different from said first and second focal lengths, optical chains having a first focal length are operated during reduced data burst mode to capture images at a first rate, optical chains having said second focal length are operated during reduced data burst mode to capture images at a second rate, and optical chains having said third focal length are operated during reduced data burst mode to capture images at a third image capture rate, at least two of said first, second and third image capture rates being different. In some such embodiments, the first, second and third image capture rates are different, and optical chains having longer focal lengths have higher image capture rates than optical chains having shorter focal length.

In various embodiments, the first optical chain has a shorter focal length than the second optical chain and captures an image corresponding to a larger scene area than second optical chain. In some such embodiments, the third optical chain of the camera device captures a third number of images during said first time period, said third optical chain having a larger focal length than said first and second optical chain.

In some embodiments, the third number of images is the same as the second number of images, and the second and third optical chains capture different portion of a scene area which overlap portions of the scene area captured by the first optical chain. In some such embodiments, optical chains corresponding to a larger focal length are operated to capture images at a faster rate than the first optical chain which has a smaller focal length.

Operation proceeds from step 4004 to step 4012, in which the camera device generates a sequence of composite images, e.g., at a desired frame rate, by combining an image captured by said first optical chains during the first period of time with multiple images captured by the second optical chain during the first time period. Following image capture and prior to combining it should be appreciated that the images are stored and/or transmitted in step 4011. Step 4012 includes step 4014, in which the camera device generates a first composite image and step 4016 in which the camera device generates a second composite image. Additional composite images are generated for each additional image in the composite image sequence being generated.

In some embodiments, step 4014 includes step 4018 and step 4016 includes step 4022. In step 4018 the camera device combines the first image captured by the first optical chain during said first period of time with a first image captured by the second optical chain during the first time period. In step 4022 the camera device combines the first image captured by the first optical chain during said first period of time with a second image captured by the second optical chain during the first time period.

In some embodiments step 4014 includes step 4020 and step 4016 includes step 4024. In step 4020 the camera device combines the first image captured by the first optical chain during said first period of time with a first image captured by the second optical chain during the first period of time and a first image captured by the third optical chain during the first period of time. In step 4024 the camera device combines the first image captured by the first optical chain during said first period of time with a second image captured by the second optical chain during the first period of time and a second image captured by the third optical chain during the first period of time.

In some embodiments additional composite images are generated in step 4012 as shown in FIG. 16 but with additional captured images also being used to generate each composite image depending on the number of camera modules being used. As discussed above generation of the composite image sequence 4012 can be done in the camera device or on an external system which receives the images captured by the camera device and performs the composite image sequence as a post capture image processing operation.

In various embodiments, the image captured by the first optical chain includes portion of a field of view which are not captured by optical chains with which the first image captured by the first optical chain is combined to generate said first composite image and said second composite image.

In accordance with various features, in some embodiments different exposure times are used for different camera modules in the camera device including multiple optical chains at least some of which have different focal lengths.

In some embodiments the method includes control the camera device to perform the following:

Set exposure time of the larger field-of-view (fov) camera module (e.g., optical chain have the smaller focal length) based on the background. In other words, the exposure of the camera module with smaller focal length is set to capture the background well.

The fov of the larger focal length camera module (e.g. optical chain which will capture a smaller image portion than the optical chain having the smaller focal length) is moved to ensure that it covers the subject, e.g., object in motion, in a scene area portion with motion.

Set exposure time for the larger focal length and smaller field-of-view camera module to ensure that the subject is captured well along with the action being performed, e.g., so the motion is captured appropriately. Shorter exposure time avoids the blur produced due to the relatively high speed of the action. In various embodiments the exposure time used for smaller focal length camera modules which is used to capture larger part of a scene area, e.g., background, is larger than the exposure times used for one or more camera modules with larger focal length which are used to capture scene area portions with motion, e.g., including moving subject.

A composite image is then generated in some embodiments by the combination of the two images. The combination ensures that the "good" parts of both the captured images are preserved. Using the above discussed methods and techniques the composite image has well-exposed background along with the non-blurry subject performing his action. In one embodiment, weighted average of the two images is generated and used as part of generating the composite image. The weighting may be and in some embodiments is, a function of motion in a scene area. The combining process may take into consideration the exposure time, e.g., pixel values may be normalized or otherwise adjusted to take into consideration the different exposure times which produce pixel values being combined.

The features can, and in some embodiments are, used enable multiple subject action shots, e.g., action shots including multiple different moving objects. A photographer may point out one or more scene area portions corresponding to motion and/or the various action-performing subjects within a scene area. As the camera device has multiple of the larger focal length cameras, in some embodiments one or more of the longer focal length camera modules, e.g., optical chains, are used to capture the scene area portions with motions and/or various subjects in motion. The exposure times for these cameras modules is set to ensure that the corresponding subject is captured well along with the action being performed.

A Burst mode can, and in some embodiments is, also supported in accordance with features of the present invention. In some embodiments burst mode is used to capture images of one or more moving objects however, motion is not required for burst mode.

A bust mode which allows for burst shots with a reduced data capture rate will now be described. A common photography practice is to capture a burst of image sequence when such actions are performed. This helps the photographers to show the action with the image sequence or to keep the most defining action shot.

In such burst capture, however, a lot of redundant data is captured in existing camera systems. This is because the background is largely static i.e., unchanged during this burst capture. The change is largely concentrated in areas near the subject, i.e., in the areas corresponding to motion and/or near objects with motion in the areas where motion occurs.

Various features of some embodiments of the invention address the redundancy of data capture. In particular, in one exemplary embodiment:

A larger fov camera module, e.g., a first optical chain having a short focal length, captures an image of a scene area, e.g., full scene area and/or background, a single time in the burst mode during a first period of time.

One or more smaller fov camera modules (having larger focal lengths than the short focal length camera module, e.g., first optical chain), capture multiple images of scene area portion with motion and/or of the moving subject during the first period of time in the burst shot. That is, in some embodiments longer focal length cameras are controlled to operate at a higher image capture rate during burst mode than the camera modules having the shorter focal length.

Images captured as part of the burst are combined, e.g., the background image captured with the shorter focal length camera module is combined with one or more images captured by the larger focal length camera module or modules to produce the burst sequence of the intended fov.

As the smaller fov camera modules are capturing action shots, in some embodiments their exposure times are lower than the exposure time used for the shorter focal length camera used to capture the background. The shorter exposure time allows for more images to be captured during a time period than could be captured if all the camera modules used the longer exposure time used by the short focal length camera module.

The camera devices of the present invention support multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention.

In various embodiments a camera with a plurality of camera modules, e.g., optical chains, is controlled to operate in either a non-motion, e.g., static, mode of operation normally used for capturing an image of a static scene or an image with a scene with little motion or a motion mode of operation used for capturing an image including motion, e.g., a moving individual or object. Each optical chain in some embodiments includes at least a lens and a sensor.

In the static mode of operation, in some embodiments, multiple different camera modules are controlled to use the same exposure time. Thus, in at least one such embodiment all camera modules of the camera use the same exposure time.

In at least one exemplary embodiment, in the motion capture mode of operation different camera modules use different exposure times to capture an image of a scene area. For example, a first camera module with a small focal length which captures a large scene area, is operated with a first exposure time. Other camera modules with larger focal lengths are operated with shorter exposure times and capture, at least in some cases, small portions of a scene area than the first camera module. Given the longer exposure time, the camera capturing the larger scene area may be blurry in areas corresponding to an objection which was in motion. To avoid such blurriness, a composite image is generated from the first image captured by the first camera module and one or more images captured by other camera modules, e.g., having larger focal lengths and which capture smaller portions of a scene area using the shorter exposure time. Given the use of the shorter exposure time, areas where there is motion will be less blurry in the images captured by the camera modules using the shorter exposure time than the camera module or module using the longer exposure time. By generating a weighted combination of pixel values taking into consideration motion in a given area, a composite image can be generated with the benefit of long exposure time for areas which are relatively static and motion free and shorter exposure times for areas where motion is occurring and may cause blurriness.

The use of a weighted average in some embodiments can result in weighted pixel values from images captured by different cameras being summed to generate the pixel values of the composite image with the weighting being a function of the level of motion in an image area. In this manner, pixel values captured using a shorter exposure time will contribute more heavily to image areas where there is motion and pixel values corresponding to image areas captured using a longer exposure time will contribute more heavily to portions of a composite image where there is little or no motion. Consider for example one embodiment where a short focal length camera module is used with a relatively long exposure time to capture an image of a larger scene area while camera modules with longer focal lengths and shorter exposure times are used to capture smaller portions of the large scene area. A composite image can then be generated with the longer exposure time being used for background image areas which are relatively static and image portions corresponding to motion being supplied by the camera modules with the shorter exposure times to avoid or reduce blurring of motion which may be caused by use of a longer exposure time.

The mode of operation may, and in some embodiments is specified by user input. For example, a user may manual set whether the camera is to operate in a non-motion mode of operation or a motion capture mode of operation. Alternatively, the camera may automatically determine the mode of operation to use based on one or more captured images. The images may be captured for purposes of camera focusing or preview or because a user triggered the taking and storing of a picture. In the case of automatic camera mode control, areas of motion in one or more captured images are identified and camera module exposure control is then based on the detected motion. For example, when motion is detected in a portion of a scene area a camera module corresponding to that portion may be set to use a shorter exposure time than a camera module used to capture a larger scene area which includes portions that do not include motion. For example, the camera module with the shortest focal length and thus which captures the largest image area may be controlled to continue using a first exposure time while one or more other camera modules with larger focal lengths and correspond to smaller scene areas maybe controlled to use shorter exposure times. In some embodiments the exposure time is a function of the amount of motion in the scene area which a camera module corresponds with shorter exposure times being used the larger the amount of motion in the scene area being captured.

Thus, in at least some embodiments a camera with multiple camera modules uses a first camera module to capture a first scene area using a first exposure time and a second camera module to capture a second scene area using a second exposure time, said second exposure time being shorter than the first exposure time. A composite image is then generated from the images captured by the different modules. In some embodiments the composite images is generated by weighting pixels corresponding to the camera module having the shorter exposures time more heavily than the camera module with the longer exposure time. Thus, in areas of motion pixel values captured by the camera with the shorter exposure time are likely to predominate to contribute in a dominate manner to the composite image while in more static areas the pixels of the image captured by the camera module or modules with the longer exposure time will predominate or contribute in a more significant manner that the camera module with the shorter exposure time. Methods, apparatus and features which support one or more modes of operation in a camera device including multiple camera modules, also sometimes referred to as optical chains, are described. Various modes of operation are supported. The supported modes of operation include one or more of a normal image capture mode, a normal burst mode, a reduced data burst mode one, and/or a motion mode of operation. All the modes need not be supported in all embodiments with some embodiments supporting one or a few of the above mentioned modes of operation.

The mode of operation to be used at a given time may, and in some embodiments is, specified by user input. For example, a user may manually set whether the camera is to operate in a non-motion mode of operation or a motion capture mode of operation. Or the user may select a reduced data burst mode of operation if desired or some other mode of operation. Alternatively, the camera may automatically determine the mode of operation to use based on one or more captured images. The images may be captured for purposes of camera focusing or preview or because a user triggered the taking and storing of a picture. In the case of automatic camera mode control, areas of motion in one or more captured images are identified and camera module exposure control is then based on the detected motion.

The normal image capture mode of operation is well suited for capturing still images also referred to as static images. In one exemplary embodiment, during the normal, e.g., static image, capture mode of operation different camera modules, e.g., with different focal lengths, may be operated using the same exposure time in parallel to capture multiple images of the scene area. Captured images may and sometimes are then combined, to generate a composite image. Such an approach works well with static images, e.g., which capture a scene area without motion or with little motion.

In at least some embodiments a motion mode of operation is supported. The motion, e.g., action shot, mode of operation is well suited for capturing scene areas where a portion of the scene area includes motion. In some embodiments during the motion mode of operation a camera module with a shorter focal length than at least one other camera module used to capture images is controlled to capture an image of a scene area using a first exposure time. The first exposure time maybe, and sometimes is determined from the content of a preview image without regard to motion. Thus, the first exposure time is well suited for capturing a large scene area even though portion of the scene area may include motion. During the motion mode of operation, camera modules with longer focal lengths capture portions of the scene area, e.g., because they correspond to a higher zoom level than the shorter focal length module. Whether a scene portion corresponds to motion or not is taken into consideration when determining the exposure time of the camera modules having the second, e.g., longer, focal length. If camera module corresponds to a scene portion with motion, the exposure time is selected to be lower than the exposure time of the camera module having the shorter focal length. However, if the camera module having the second longer focal length corresponds to a scene portion with no motion, the same exposure time used for the first camera module with the shorter focal length is used. However, in other embodiments, the exposure time for the camera module corresponding to the portion of the scene area without motion is determined independently based on the content of the scene portion to which the camera module corresponds without regard to motion when the camera module is determined to correspond to a scene portion without motion or with little motion. For camera modules with the second, e.g., longer, focal length which correspond to portions of a scene area with motion, an exposure time is used which is shorter than the exposure time used for the first camera module having the first, e.g., shorter, focal length. In this way, at least one image of scene area of interest will be captured with an exposure time optimized for the overall scene area while portion of the scene area with motion will be captured by a camera module or modules having a shorter exposure time which will reduce blurriness due to motion but potentially at the cost of using a less than optimal exposure time.

In some but not necessarily all embodiments, the exposure time used by camera modules having the second, longer, focal length and corresponding to scene portions of motion have exposure times which are determined based on the amount of motion in the scene portion. The amount of motion maybe estimated based on blurriness of a preview image with a blurrier image indicating a higher amount of motion then a less blurry image. The greater the amount of motion in a scene portion, the lower the exposure time used for a camera module having the same, e.g., longer, focal length than that used to capture the overall scene. Thus, in some but not necessarily all embodiments, in the case of motion, multiple camera modules having the same, e.g., second, focal length, but corresponding to different scene portions, e.g., one with no motion, one with a first level of motion and one with a second higher level of motion, may each use different exposure times with the exposure time decreasing as the amount of motion increases.

Composite images maybe, and sometimes are generated from images captured in parallel using different camera modules, e.g., with different focal lengths and/or exposure times. Normalization of the pixel values of different captured by different camera modules to compensate for different exposure times prior to or as part of the combining process maybe and sometime is performed.

In some embodiments, during generation of composite images from images captured during a motion mode of operation, pixel values from different images are weighted as part of the combining process. The weighting of a pixel value takes into consideration whether the pixel value corresponds to an area of motion or not. In cases where a pixel value corresponds to an area of motion, pixel values from images with shorter exposure times are weighted more heavily than pixel values corresponding to images generated with longer exposure times. For pixels which correspond to scene area with little or no motion, pixel values corresponding to images with the longer exposure, e.g, the exposure time used for the camera module with the shortest focal length, are weighted more heavily than pixel values corresponding to images with shorter exposure times.

In some embodiments analysis of images is performed to identify which sub portions of a captured image correspond to areas of motion. The analysis may involve examining one or more images for blurriness which maybe indicative of motion and/or comparing of portions of images corresponding to the same scene area but which were captured with different exposure times with differences between the pixel values being indicative of motion. Thus, while portions of a scene captured by a camera module may be designated as corresponding to motion based on user input or analysis of a preview image for purposes of determining what exposure to use for a camera module during the image capture process, more detailed analysis of the captured images maybe performed to determine the appropriate weighting to be applied when combining pixel values from different images to generate a pixel value of a composite, e.g., output, image.

The generation of the composite image maybe performed by the camera device or a system, e.g., computer system including a processor and memory, as part of a post capture image processing process used to generate one or more composite images.

By controlling exposure times of different camera modules based on whether a camera module captures a scene portion corresponding to motion or not, and combining pixel values with pixel values from an image captured using an exposure time which was determined with regard to whether or not the scene included motion, the benefits of longer exposure times for static image portions and shorter exposure times for scene portions with motion can be achieved from images captured by a single camera device.

In at least some embodiments, a camera device including multiple camera modules supports a normal burst mode of operation. During the normal burst mode of operation each of a set of camera modules is operated in parallel during a number of successive image capture time periods corresponding to a period of time in which the camera operates in burst mode. The images from the camera modules are stored and then combined, e.g., to generate a composite image for each image capture time period. In such an embodiment since each camera module used for burst mode is operated during the individual image capture time periods, a large number of images are captured and stored. Such a mode can produce high quality images but can also require a large amount of memory to store the images captured during each capture time period as well as a fair amount of power to operate the full set of modules during each image capture time period.

In at least one embodiment, a camera device including multiple camera modules supports a reduced data burst mode. The reduced data burst can be provided as an alternative to the normal data burst mode or, in some embodiments the camera device allows the user to select between use of the normal burst mode and reduced data burst mode.

The reduced data burst mode in some embodiments maybe used as a video capture mode of operation. The reduced data video mode of operation can be considered a special case of burst mode where the image capture rate is intended to support a desired video frame rate.

In various embodiments in which a reduced data burst mode is supported, a camera device supporting the mode of operation includes a plurality of different optical chains, e.g., camera modules. At least some of the camera modules have different focal lengths. During the reduced data burst mode of operation, different camera modules are operated at different image capture rates during a capture time interval. In at least some embodiments a camera module having a first, e.g., short, focal length captures images at a lower rate than a camera module having a second, e.g., longer focal length. Camera modules having a third, e.g., focal length, longer than the first and send focal lengths maybe operated at the same image capture rate as the camera modules with the second focal length or at a faster image capture rate depending on the embodiment.

By capturing images at different rates, the full set of camera modules used during the reduced data burst mode of operation will not operate during all image capture time periods. Thus fewer images are captured and stored as compared to embodiments where the full set of camera modules used during burst mode are used during each capture time interval.

In one particular exemplary embodiment camera modules having the longest focal length used during a reduced data burst mode of operation are used to capture images during each capture time period while one or more of the shorter focal length camera modules may be used once or a few times during a capture time interval.

A composite image output stream is generated in some embodiments by combining the same image captured by a short focal length camera module with multiple images captured by the longer focal length camera module at different times. Thus, while the longer focal length camera modules may capture motion or other information at relatively frequent intervals, e.g., at a desired output composite image rate, the shorter focal length modules used to capture a large scene area which maybe mostly background which does not change frequently over time, maybe captured at a relatively low rate. By using the reduced data burst mode of operation storage requirements are reduced as compared to the normal burst mode since fewer images are captured and stored in a given time period, e.g., a fraction of the number captured and stored in the normal burst mode. Power consumption is also reduced since fewer camera modules are operated in parallel during at least some image capture time periods. While power data storage requirements and power consumption is reduced as compared to normal burst mode, in the reduced data burst mode quality of the composite images remains good since changes due to motion are likely to be captured by the longer focal length modules which are normally directed to the area of greatest interest as part of a user's normal process of orienting a camera to capture the scene portions of interest. While in burst mode camera modules normally use the same exposure time irrespective of their focal length, in cases where exposure time used for the shorter focal length camera exceeds the desired composite image output frame rate, the exposure time of the camera modules with the longer focal length is decreased to allow for more images to be captured in a given time period. Images may be subject to an exposure normalization process prior to the pixel values being combined to compensate for different exposure times in cases where different camera modules use different exposure times.

During reduced data burst mode operation images captured from the camera modules operating at different image capture rates are stored in memory. the images are then combined, e.g., by the camera or by another system performing post capture image processing, to generate a composite image stream having a desired image output rate, e.g., frame rate.

In some embodiments during reduced data burst mode camera modules having the longest focal length, and thus capture the portion of the scene area in the greatest detail, are sometimes operated to capture images at the desired output rate, e.g., the rate of a video stream or burst sequence to be generated.

It should be appreciated that while a camera device may support multiple modes of operation, e.g., two or more of the different modes of operation discussed above, this is not necessary for all camera device embodiments.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method of capturing images using a camera device including a plurality of optical chains including a first optical chain and at least a second optical chain, the method comprising:
   operating the first optical chain to capture a first number of images at a first frame rate during a first period of time; and
   operating a second optical chain to capture a second number of images at a second frame rate during said first period of time, wherein said second frame rate is different from said first frame rate and wherein the second number of images is different from said first number of images, at least one image captured by the second optical chain during the first period of time being captured in parallel with one of the images captured by the first optical chain during said first period of time; and
   wherein an image capture rate is different during said first period of time for at least some optical chains having different focal lengths, the method further comprising:
   controlling at least one optical chain corresponding to a larger focal length to capture images at a faster rate than an optical chain corresponding to a smaller focal length, the first optical chain having a smaller focal length than said second optical chain and being controlled to capture images at a slower rate than said second optical chain during said first period of time.

2. The method of claim 1, wherein said second number of images is larger than said first number.

3. The method of claim 1, wherein said first and second optical chains have different focal lengths, said second focal length being longer than said first focal length.

4. The method of claim 3,
   wherein said camera device supports a normal burst mode of operation and a reduced data burst mode of operation and wherein said first time period is a time period during which said camera device is operating in said reduced data burst mode of operation.

5. The method of claim 3,
   wherein said first optical chain captures a larger scene area than said second optical chain, the method further comprising:
   generating a sequence of composite images by combining an image captured by said first optical chain during said first period of time with multiple images captured by said second optical chain during said first period of time.

6. The method of claim 5, wherein generating a sequence of composite images includes:
   generating a first composite image and a second composite image.

7. The method of claim 6,
   wherein generating a first composite image includes combining a first image captured by the first optical chain during the first period of time with a first image captured by the second optical chain during the first period of time; and
   wherein generating a second composite image includes combining the first image captured by the first optical chain during the first period of time with a second image captured by the second optical chain during the first period of time.

8. The method of claim 6, further comprising:
   operating a third optical chain, having a focal length which is longer than said first focal length, to capture images during said first period of time at the same rate as said second optical chain; and
   wherein generating a first composite image includes combining a first image captured by the first optical chain during the first period of time with a first image captured by the second optical chain during the first period of time and a first image captured by the third optical chain during said first period of time; and
   wherein generating a second composite image includes combining the first image captured by the first optical chain during the first period of time with a second image captured by the second optical chain during the first period of time and a second image captured by the third optical chain during said first period of time.

9. The method of claim 8, wherein the first image captured by the first optical chain includes portions of a field of view which are not captured by optical chains with which the first image captured by the first optical chain is combined to generate said first composite image and said second composite image.

10. A method of capturing images using a camera device including a plurality of optical chains including a first optical chain and at least a second optical chain, the method comprising:
    operating the first optical chain to capture a first number of images at a first frame rate during a first period of time; and
    operating a second optical chain to capture a second number of images at a second frame rate during said first period of time, wherein said second frame rate is different from said first frame rate and wherein the second number of images is different from said first number of images, at least one image captured by the second optical chain during the first period of time being captured in parallel with one of the images captured by the first optical chain during said first period of time;
    wherein the first optical chain has a first focal length;
    wherein the second optical chain has a second focal length which is larger than said first focal length;
    wherein the camera device includes a third optical chain having a third focal length which is different from said first and second focal lengths; and
    wherein said first period of time corresponds to a period of time in which the camera device is operating in a reduced data burst mode of operation, operating in the reduced data burst mode of operation including operating the one of the first, second and third optical chains which captures the smallest portion of a scene area at a faster image capture rate during said first period of time than optical chains capturing a larger portion of the scene area.

11. The method of claim 10,
wherein said first, second and third image capture rates are different; and
wherein optical chains having longer focal lengths have higher image capture rates than optical chains having shorter focal lengths.

12. The method of claim 3, wherein the first optical chain has a shorter focal length than said second optical chain and captures an image corresponding to a larger scene area than said second optical chain.

13. The method of claim 12, further comprising:
operating a third optical chain of said camera device to capture a third number of images during said first time period, said third optical chain having a larger focal length than said first and second optical chains.

14. The method of claim 13, wherein said third number of images is the same as the second number of images, said second and third optical chains capturing different portions of a scene area which overlap portions of the scene area captured by said first optical chain.

15. The method of claim 1, wherein the camera device includes nine or more optical chains.

16. A camera device comprising:
a plurality of optical chains including a first optical chain and a second optical chain, said first optical chain having a smaller focal length than said second optical chain; and
a control device configured to:
control the first optical chain to capture a first number of images at a first frame rate during a first period of time;
control the second optical chain to capture a second number of images at a second frame rate during said first period of time, wherein said second frame rate is different from said first frame rate and wherein the second number of images is different from said first number of images, at least one image captured by the second optical chain during the first period of time being captured in parallel with one of the images captured by the first optical chain during said first period of time; and
control at least one optical chain corresponding to a larger focal length to capture images at a faster rate than an optical chain corresponding to a smaller focal length, the first optical chain having a smaller focal length than said second optical chain being controlled to capture images at a slower rate than said second optical chain during said first period of time.

17. The camera device of claim 16, wherein said first number is one and said second number is at least two.

18. The camera device of claim 16, wherein said control device is a processor.

19. The camera device of claim 18,
wherein said camera device is a multi-mode handheld camera device including at least one optical chain having a first focal length, at least four optical chains having a second focal length and at least four optical chains have a third focal length, said second focal length being longer than said first focal length and said third focal length being longer than said second focal length; and
wherein said control device is further configured to control said four optical chains having the second focal length to use a shorter exposure time than an exposure time used by said first optical chain.

20. A non-transitory computer readable medium including computer executable instructions which when executed by a processor control a camera device including a plurality of optical chains including a first optical chain having a first focal length and at least a second optical chain having a second focal length, said first focal length being shorter than said second focal length, to:
operate the first optical chain to capture a first number of images at a first frame rate during a first period of time;
operate a second optical chain to capture a second number of images at a second frame rate during said first period of time, wherein said second number of images is different from said first number of images, at least one image captured by the second optical chain during said first period of time being captured in parallel with one of the images captured by the first optical chain during said first period of time; and
control at least one optical chain corresponding to the second focal length to capture images at a faster rate than an optical chain corresponding to the first focal length which is smaller than said second focal length, said computer executable instructions controlling the first optical chain to capture images at a slower rate than said second optical chain during said first period of time, said first frame rate being lower than said second frame rate.

* * * * *